(12) United States Patent
Schickling et al.

(10) Patent No.: US 10,851,917 B2
(45) Date of Patent: Dec. 1, 2020

(54) SEISMIC CLAMP FOR NON-STRUCTURAL COMPONENTS IN A BUILDING

(71) Applicant: Cooper Technologies Company, Houston, TX (US)

(72) Inventors: Alexander W. Schickling, Edwardsville, IL (US); Nicholas R. Grahek, Highland, IL (US); Bret Eilerman, Highland, IL (US); Martin L. Witherbee, Godfrey, IL (US); Stephanie D. Osborn, Breese, IL (US); Sarah Hempen, Troy, IL (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/847,452

(22) Filed: Dec. 19, 2017

(65) Prior Publication Data

US 2019/0137009 A1    May 9, 2019

Related U.S. Application Data

(63) Continuation-in-part of application No. 15/807,497, filed on Nov. 8, 2017, now abandoned.

(51) Int. Cl.
| | |
|---|---|
| F16L 3/12 | (2006.01) |
| F16L 3/13 | (2006.01) |
| F16B 2/06 | (2006.01) |
| F16B 2/24 | (2006.01) |
| F16B 7/04 | (2006.01) |
| F16L 3/24 | (2006.01) |
| F16L 3/08 | (2006.01) |

(52) U.S. Cl.
CPC ............ *F16L 3/1211* (2013.01); *F16B 2/065* (2013.01); *F16B 2/241* (2013.01); *F16B 7/0493* (2013.01); *F16L 3/13* (2013.01); *F16L 3/245* (2019.08); *F16L 3/085* (2013.01)

(58) Field of Classification Search
CPC .................................. F16L 3/1211; F16L 3/13
USPC ................ 248/49, 56, 62, 65, 67.7, 73, 74.1
See application file for complete search history.

(56) References Cited

U.S. PATENT DOCUMENTS

| | | | | |
|---|---|---|---|---|
| 2,442,833 A | * | 6/1948 | Watkins | F16L 3/00 248/49 |
| 4,601,451 A | * | 7/1986 | Leonardo | H01R 4/40 24/115 F |
| 4,729,532 A | * | 3/1988 | Moss | F16L 3/00 248/230.1 |

(Continued)

OTHER PUBLICATIONS

B-Line by Eaton, Seismic Bracing, Fire Protection Solutions, at least since Nov. 7, 2016, 1 page.

(Continued)

*Primary Examiner* — Muhammad Ijaz
(74) *Attorney, Agent, or Firm* — Stinson LLP

(57) ABSTRACT

A seismic clamp for securing a utility pipe to a rigid rod includes a pipe holder that secures the utility pipe to the seismic clamp. A rod fitting secures the rigid rod to the seismic clamp so that the rigid rod extends transverse to the utility pipe. A spacer is disposed between the holder and the rod fitting. The spacer inhibits the rigid rod from contacting the utility pipe when the utility pipe is secured to the seismic clamp, and the rigid rod is secured to the seismic clamp.

12 Claims, 33 Drawing Sheets

(56) References Cited

U.S. PATENT DOCUMENTS

| | | | | |
|---|---|---|---|---|
| 5,215,281 A * | 6/1993 | Sherman | ............... | F16L 3/1207 |
| | | | | 248/219.4 |
| 6,098,942 A * | 8/2000 | Heath | ............... | F16L 3/24 |
| | | | | 248/228.6 |
| 6,227,757 B1 * | 5/2001 | Delouvee | ............... | F16B 7/0493 |
| | | | | 403/400 |
| 6,273,377 B1 * | 8/2001 | Archer | ............... | F16B 2/065 |
| | | | | 248/218.4 |
| 7,523,895 B1 * | 4/2009 | Kirschner | ............... | F16L 3/04 |
| | | | | 248/230.1 |
| 7,849,819 B2 * | 12/2010 | Moreau | ............... | A01K 1/00 |
| | | | | 119/523 |
| 8,353,486 B2 | 1/2013 | Osborn et al. | | |
| 9,874,297 B2 * | 1/2018 | Campbell | ............... | F16L 3/237 |
| 2007/0108351 A1 * | 5/2007 | Gatta | ............... | B60R 11/00 |
| | | | | 248/56 |
| 2011/0017880 A1 * | 1/2011 | Osborn | ............... | F24F 13/0254 |
| | | | | 248/74.1 |
| 2014/0197282 A1 * | 7/2014 | Turner | ............... | F16L 3/20 |
| | | | | 248/49 |
| 2014/0367530 A1 * | 12/2014 | Radzik | ............... | F16L 3/1207 |
| | | | | 248/72 |
| 2015/0144747 A1 * | 5/2015 | Castellanos | ............... | F16L 25/04 |
| | | | | 248/74.1 |
| 2016/0146377 A1 * | 5/2016 | Campbell | ............... | F16L 3/221 |
| | | | | 52/745.21 |

OTHER PUBLICATIONS

Pentair, Quick Grip Lateral Sway Brace, at lease since Nov. 7, 2016, 2 pages.

PHD Manufacturing, Inc., Sqaay Brace Fitings, at least since Nov. 7, 2016, 2 pages.

\* cited by examiner

SEISMIC CLAMP FOR NON-STRUCTURAL COMPONENTS IN A BUILDING

CROSS-REFERENCE TO RELATED APPLICATIONS

The present application is a continuation-in-part of U.S. Ser. No. 15/807,497, filed Nov. 9, 2017, the entirety of which is hereby incorporated by reference.

FIELD OF THE DISCLOSURE

The present disclosure generally relates to a seismic clamp for non-structural components in a building. The seismic clamp can be used, for example, as part of a seismic sway brace or a restraint.

BACKGROUND OF THE DISCLOSURE

Seismic supporting systems may be used to support non-structural components (e.g., pipes) in a building. Such seismic supporting systems include seismic sway braces and restraints (e.g., branch line restraints). Seismic sway braces are used to minimize the differential movement between non-structural components (e.g., pipes) in a building and the building itself. Examples of non-structural components in a building are utility pipes, which may include, but are not limited to, plastic pipes, conduits, round ducts, other types of pipes, etc. A properly installed sway brace makes it possible for the building and the non-structural pipe to move as a single unit during an earthquake, thereby limiting damage to the non-structural pipe. Restraints hold the non-structural components in place to a lesser degree than seismic sway braces. For example, restraints inhibit the movement of fire sprinkler branch lines which could cause damage to themselves, the structure or other nearby non-structural systems, such as air handling ducts, plumbing or electrical systems. Building code NFPA describes requirements for both seismic sway braces and restraints. There are other types of seismic supporting systems other than seismic sway braces and restraints.

Conventional seismic supporting systems may include a seismic clamp (e.g., pipe clamp) attached to a bracing pipe or other bracing member. The seismic clamp is attached to the non-structural pipe, and the bracing pipe is attached to a structural component of the building (e.g., a beam).

SUMMARY OF THE DISCLOSURE

In one aspect, a braced utility assembly within a building generally comprises a utility pipe; a rigid rod; and a seismic clamp securing the utility pipe to the rigid rod such that the rigid rod extends transverse to the utility pipe. The seismic clamp includes a spacer disposed between the utility pipe and the rigid rod to inhibit the rigid rod from contacting the utility pipe.

In another aspect, a method of bracing a utility pipe in a building generally comprises securing the utility pipe to a seismic sway brace. The seismic sway brace includes a rigid rod and a seismic clamp. The seismic clamp secures the utility pipe to the rigid rod. The rigid rod extends transverse to the utility pipe, and the rigid rod and the utility pipe are free from contact with one another when the rigid rod and the utility pipe are secured to the seismic clamp.

In yet another aspect, a seismic clamp for securing a utility pipe to a rigid rod generally comprises a pipe holder configured to secure the utility pipe to the seismic clamp such that the utility pipe extends in a first direction. A rod fitting is configured to secure the rigid rod to the seismic clamp so that the rigid rod extends in a second direction transverse to the first direction. A spacer is disposed between the pipe holder and the rod fitting. The spacer is configured to inhibit the rigid rod from contacting the utility pipe when the utility pipe is secured to the seismic clamp and the rigid rod is secured to the seismic clamp.

DETAILED DESCRIPTION OF THE DISCLOSURE

Disclosed herein are embodiments of a seismic clamp for bracing a non-structural component to a rigid rod within a building. For example, the seismic clamp may be suitably configured for use in a sway brace, or a restraint, or other non-structural seismic supporting systems. Thus, the described embodiments are not limited to seismic sway braces or restraints. In the illustrated embodiments, each seismic clamp is suitably configured for use with at least a rigid rod RR having a circular cross-sectional shape, although in other embodiments the seismic clamp may be configured for rigid rods having other shapes. Moreover, the rigid rod may include a pipe, a solid rod, a threaded rod, a bar, a strut channel, or other types of rigid rods. As is generally known, the rigid rod may be secured to and extend from a structural component of the building, such as a beam, using a seismic clamp or other device. In the illustrated embodiments, each seismic clamp is suitably configured for bracing a non-structural pipe, such as a utility pipe, which may include, but is not limited to, a pipe, a conduit, a round duct, or another type of pipe, to the rigid rod. For example, in a particular embodiment, the pipe for use with the brace may be a plastic pipe, including but not limited to a plastic pipe comprising chlorinated polyvinyl chloride (CPVC), or a plastic pipe consisting essentially of CPVC, or another type of plastic pipe. In another embodiment, the braced pipe may be a soft metal or thin metal pipe. In each illustrated embodiment, the seismic clamp includes a spacer disposed between the plastic utility pipe and the rigid rod to inhibit the rigid rod from contacting the utility pipe. Also, in each illustrated embodiment, the brace is configured to limit the force applied to the utility pipe so that the brace does not deform, either plastically or elastically, the utility pipe, and in particular a plastic utility pipe (e.g., a CPVC pipe).

Figure 1:
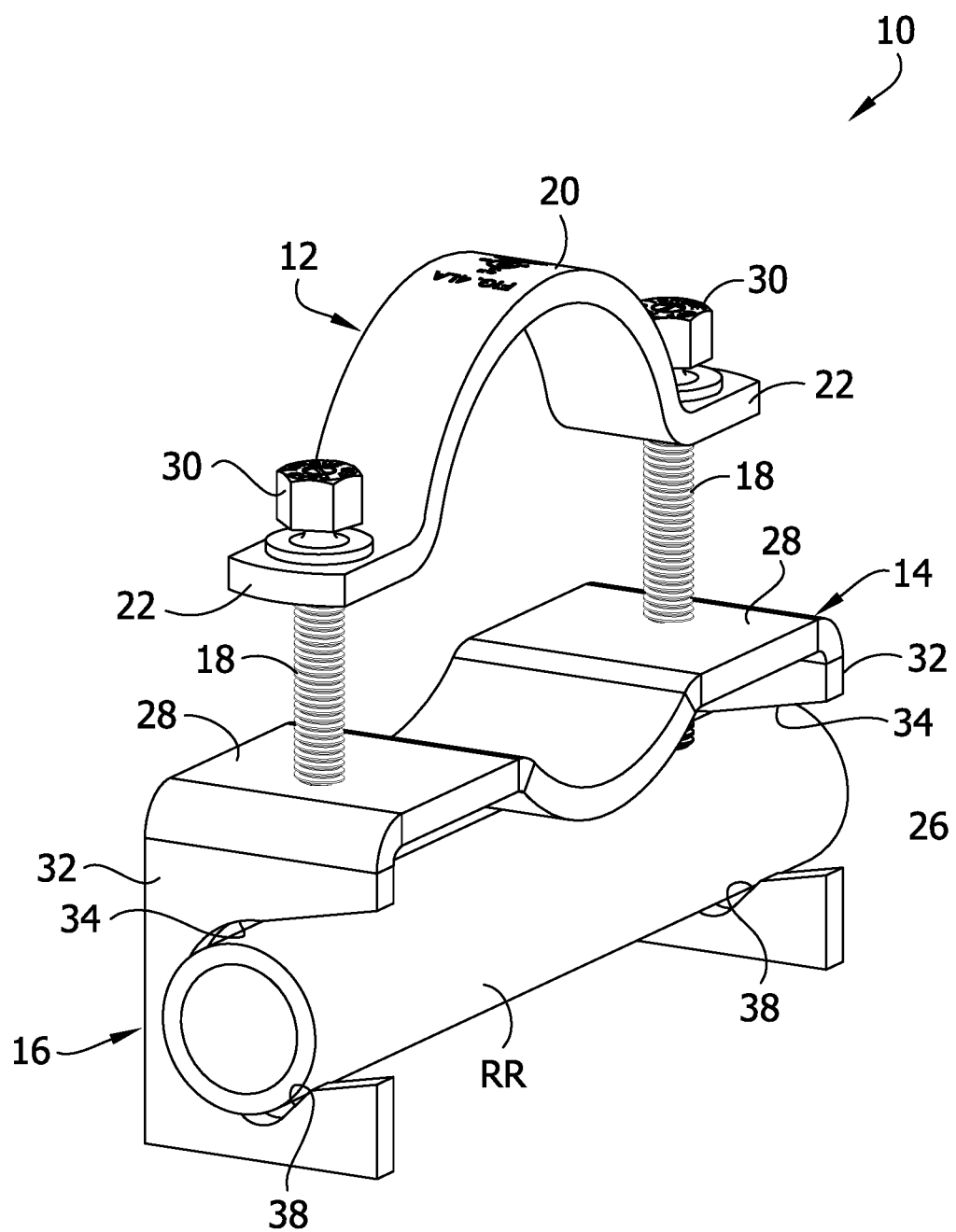
FIG. 1 is a perspective of a first embodiment of a seismic clamp for a seismic supporting system constructed according to the teachings of the present disclosure.
Figure 2:
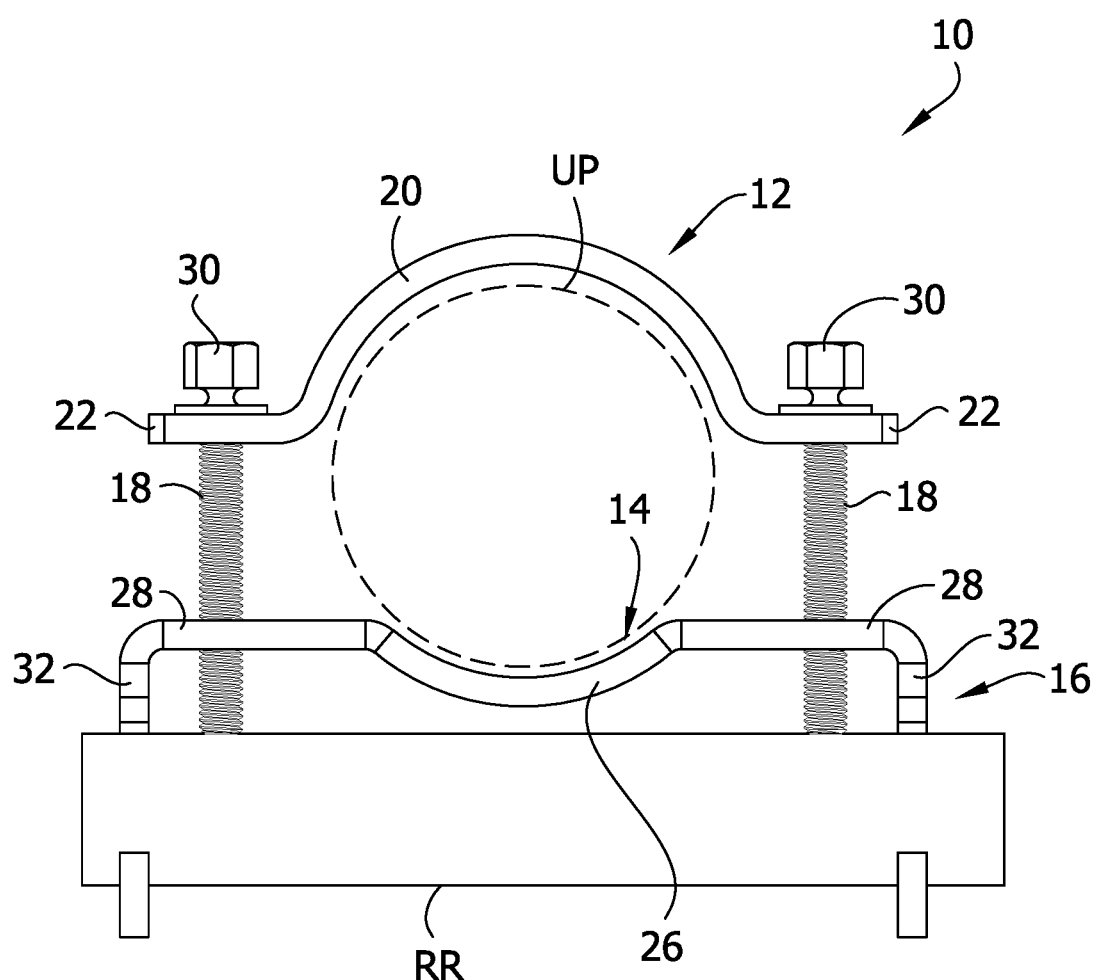
FIG. 2 is a front elevation of the seismic clamp of FIG. 1.
Figure 3:
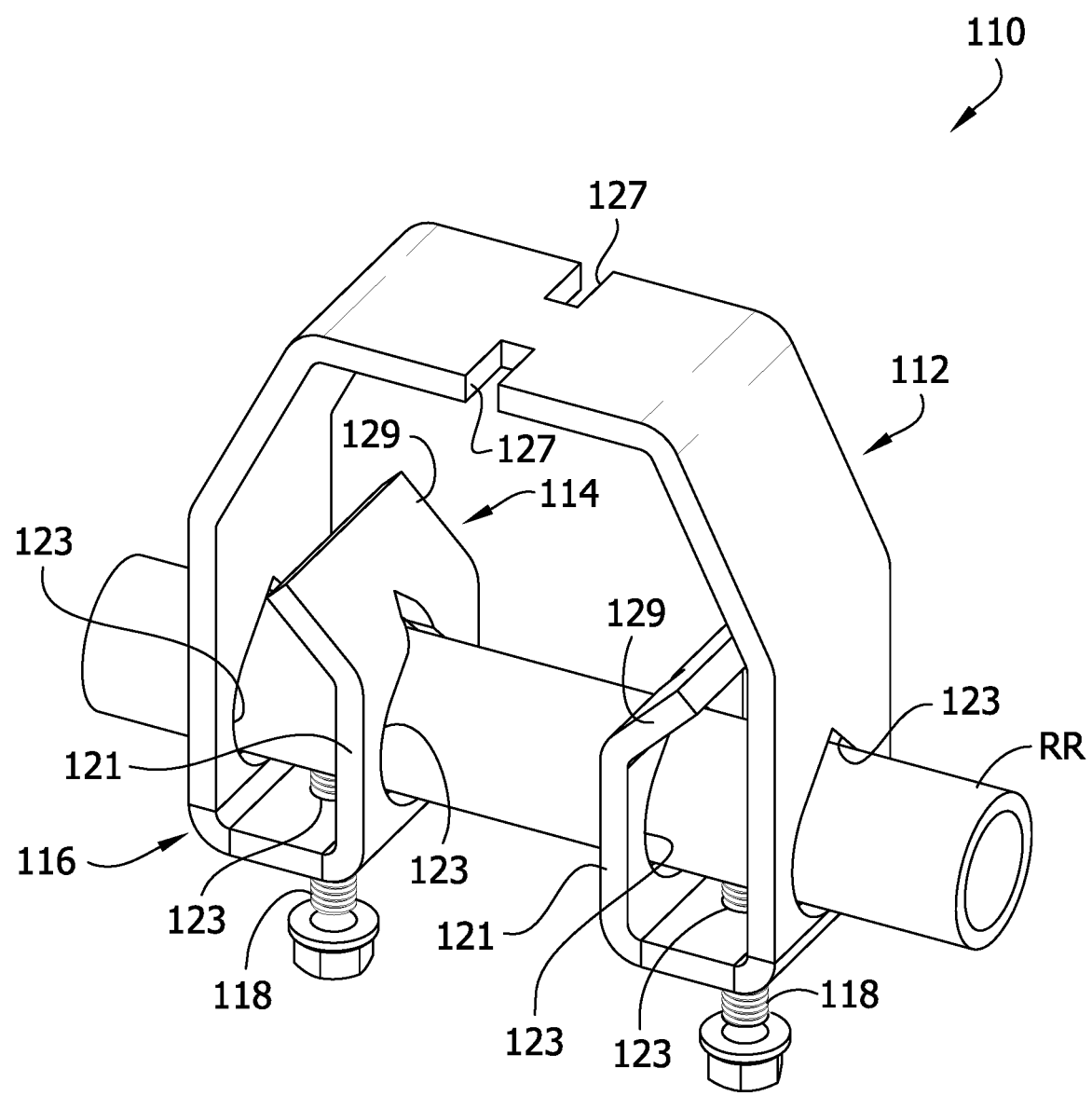
FIG. 3 is a perspective of a second embodiment of a seismic clamp constructed according to the teachings of the present disclosure.

Referring to FIGS. 1 and 2, a first embodiment of the seismic clamp for bracing a non-structural component, such as the utility pipe UP, to the rigid rod RR within a building is generally indicated at reference numeral 10. The seismic clamp 10 generally includes a pipe holder, generally indicated at 12, configured to secure the utility pipe UP on the seismic clamp; a spacer, generally indicated at 14, configured to be disposed between the utility pipe and the rigid rod to inhibit the rigid rod from contacting the utility pipe when the utility pipe is secure to the seismic clamp; and a rod fitting, generally indicated at 16, configured to secure the seismic clamp to the rigid rod. In this embodiment, the spacer 14 and the rod fitting 16 are integrally formed as a single, one-piece component, although the components may be formed separately. For example, the spacer 14 and the rod fitting 16 may be formed from a piece of metal, such as a flat sheet of metal. Moreover, as explained in more detail below, the holder 12 is formed separate from the spacer 14 and the rod fitting 16 and secured to the spacer/rod fitting component by one or more fasteners 18 (e.g., threaded fastener, such as a bolt or screw).

Referring still to FIGS. 1 and 2, the pipe holder 12 comprises a strap including a generally arcuate central portion 20 defining a bearing surface sized and shaped to extend partially around the circumference of the utility pipe UP, and opposite first and second ears 22 extending outward from opposite ends of the central portion. The strap may be formed from a flat piece of metal or other material. The spacer 14 includes a saddle 26 defining bearing surface on which the utility pipe UP is supported, and opposite first and second ears 28 extending outward from opposite ends of the saddle. The saddle 26 generally opposes the central portion 20 of the pipe holder 12, and the first and second ears 28 generally opposes the respective first and second ears of the pipe holder 12. The fasteners 18 extend through aligned openings (e.g., threaded openings) extending through the first and second respective ears 22, 28. Tightening the fasteners 18 brings the holder 12 toward the spacer 14 to secure the utility pipe UP between the holder and the spacer. For reasons explained below, in the illustrated embodiment, the fasteners 18 are torque-limiting bolts, whereby once a desired torque on the bolt head 30 is reached the bolt head shears off the remainder of the bolt to inhibit additional tightening of the bolt.

The illustrated rod fitting 16 includes first and second opposing arms 32 extending from the respective first and second ears 28 of the spacer 14 in a direction opposite the holder 12. The arms 32 define rod-receiving openings 34 extending through the arms 32 and from front sides of the arms toward rear sides of the arms to allow the rigid rod RR to enter the rod-receiving openings through the front sides of the arms. The ends of the fasteners 18 extending through the ears 28 of the spacer 14 engage the rigid rod RR within the rod-receiving openings 34. The arms 32 include bearing surfaces 38 partially defining the rod-receiving openings 34 that support the rigid rod RR. The fasteners 18 function as set screws pressing the rigid rod RR against the bearing surfaces 38 to secure the fitting 16 to the rigid rod RR. Through this arrangement, the rigid rod RR and the utility pipe UP extend transverse (e.g., perpendicular) with respect to one another.

In the illustrated embodiment, the brace 10 is configured to limit the force applied to the utility pipe UP by the holder 12 so that the holder does not deform, either plastically or elastically, the utility pipe, and in particular a plastic utility pipe (e.g., a CPVC pipe). In other words, the outer dimension of the utility pipe at the location where it is being secured by the holder does not change during or after securement. In the illustrated embodiment, the bolt head 30 of each fastener 18 shears off during fastening after a predetermined torque on the bolt head has been reached. For example, when the ends of the fasteners 18 engage the rigid rod RR after a certain amount of tightening, additional torque applied to the bolt head 30 will shear the bolt head off the bolt thereby inhibiting additional tightening of the holder 12 on the utility pipe UP. In this way, the brace 10 is secured to the rigid rod RR and the holder does not deform, either plastically or elastically, the utility pipe UP.

Figure 4:
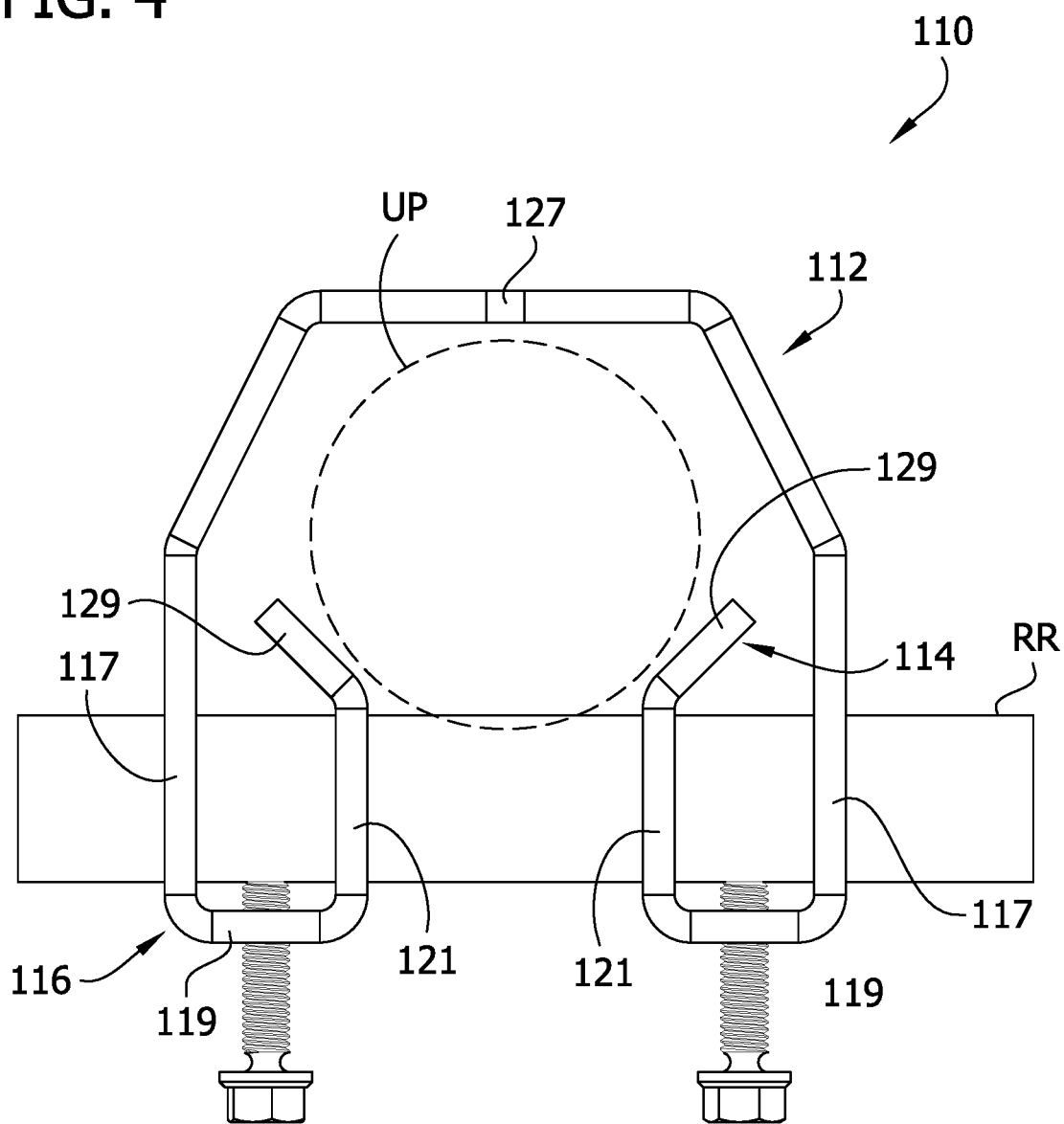
FIG. 4 is a front elevation of the seismic clamp of FIG. 3.
Figure 5:
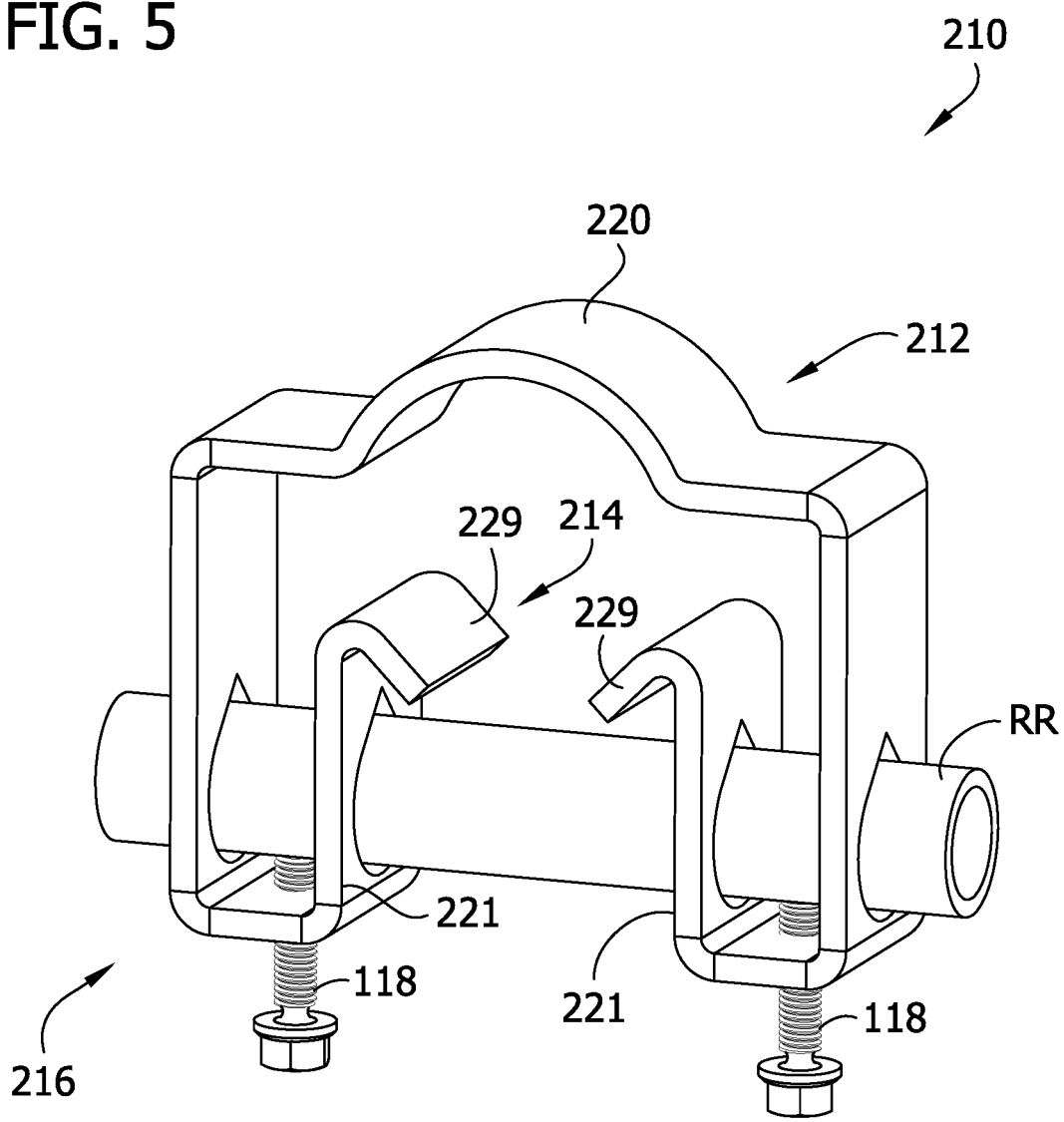
FIG. 5 is a perspective of a third embodiment of a seismic clamp constructed according to the teachings of the present disclosure.

Referring to FIGS. 4 and 5, a second embodiment of the seismic clamp for bracing a non-structural component, such as the utility pipe UP, to the rigid rod RR within a building is generally indicated at reference numeral 110. The seismic clamp 110 generally includes a pipe holder, generally indicated at 112, configured to secure the utility pipe UP to the seismic clamp; a spacer, generally indicated at 114, configured to be disposed between the utility pipe and the rigid rod to inhibit the rigid rod from contacting the utility pipe when the utility pipe is secured to the seismic clamp; and a rod fitting, generally indicated at 116, configured to secure the seismic clamp to the rigid rod. The pipe holder 112, the spacer 114, and the rod fitting 116 are integrally formed as a one-piece component, such as from metal (e.g., sheet metal). The pipe holder 112 has a generally U-shape for partially surrounding a circumference of the utility pipe UP. The rod fitting 116 includes opposite channel-shaped arms extending downward from opposite ends of the pipe holder 112. Each channel-shaped arm includes a first side wall 117 connected to the corresponding end of the pipe holder, a bottom wall 119 extending inward from the first side wall, and a second side wall 121 extending upward from the bottom wall in opposing relationship with the first side wall. Aligned rod-receiving openings 123 extend through the first and second side walls 117, 119 and are sized and shaped to receive the rigid rod therethrough. The spacer 114 includes tabs 129 defining bearing surfaces on which the utility pipe UP is supported. The tabs 129 extend upward from the upper ends of the respective second side walls 121. The tabs 129 flare outward away from one another to define a generally V-shaped saddle.

In the illustrated embodiment, a central portion of the pipe holder 112 is bendable out-of-plane at an area of weakness (e.g., notches 127) so that the tabs 129 of the spacer 114 (and the rod fitting arms) open up to allow the utility pipe UP to be received between the spacer and the central portion of the pipe holder. The pipe holder 112 can then be closed by bending the central portion of the pipe holder so that the tabs 129 are brought toward one another. In the illustrated embodiment, the brace 110 is configured to limit the force applied to the utility pipe UP by the holder 112 so that the holder does not deform, either plastically or elastically, the utility pipe, and in particular a plastic utility pipe (e.g., a CPVC pipe). In other words, the outer dimension of the utility pipe UP at the location where it is being secured does not change during or after securement. In other embodiments, the pipe holder 112 may not be bendable out of plane, but instead, the pipe holder may be slidably received on the utility pipe UP. Threaded fasteners 118 extend through openings 123 (e.g., threaded openings) in the bottom wall 119 and engage the rigid rod RR. The side walls 117, 121 include bearing surfaces partially defining the rod-receiving openings 123. The fasteners 118 function as set screws pressing the rigid rod RR against the bearing surfaces to secure the fitting 116 to the rigid rod RR. Through this arrangement, the rigid rod RR and the utility pipe UP extend transverse (e.g., perpendicular) with respect to one another. The fasteners 118 may be torque-limiting bolts.

Figure 6:
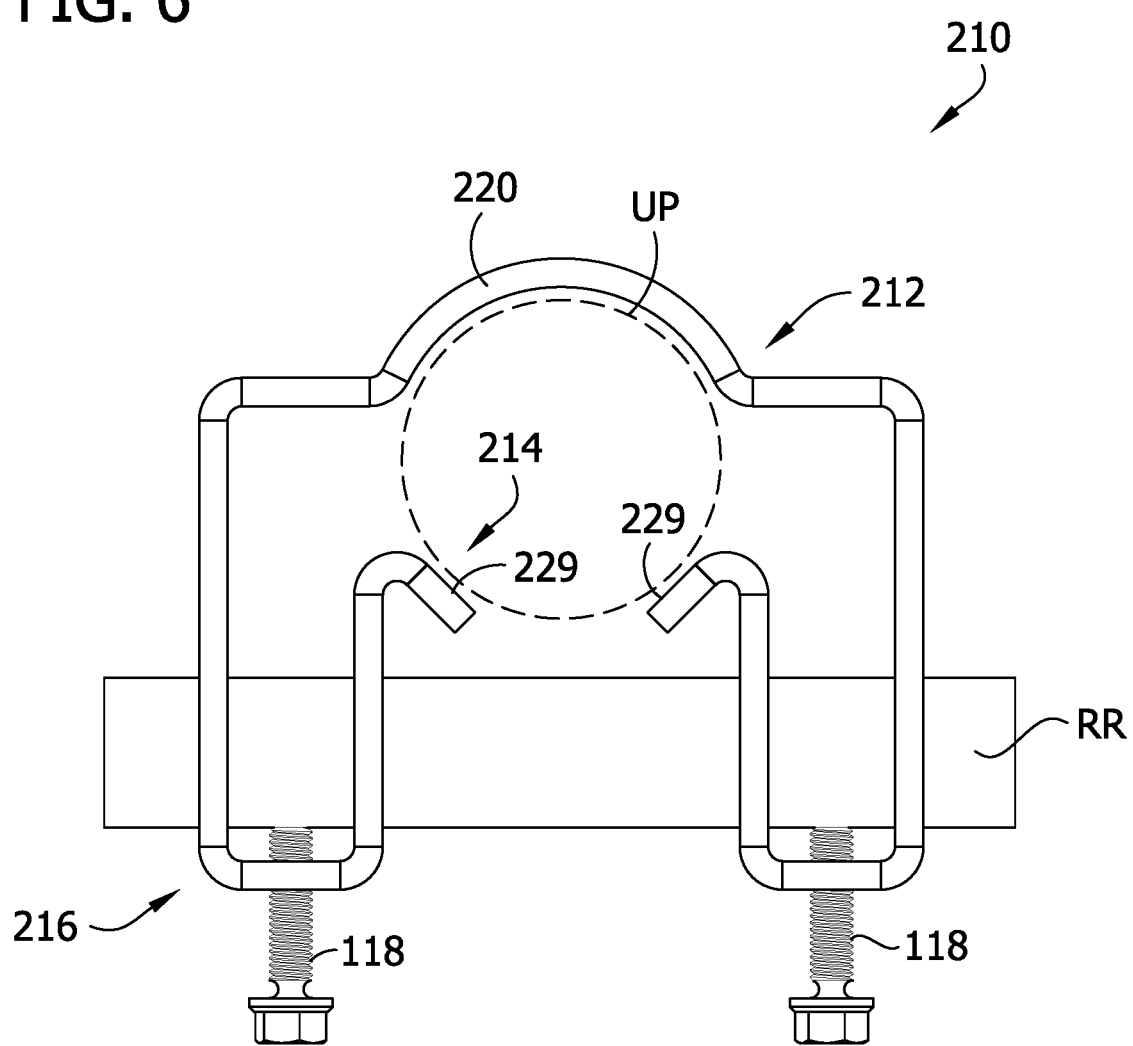
FIG. 6 is a front elevation of the seismic sway brace of FIG. 5.

Referring to FIGS. 5 and 6, a third embodiment of the seismic clamp for bracing a non-structural component, such as the utility pipe UP, to the rigid rod RR within a building is generally indicated at reference numeral 210. The seismic clamp 210 generally includes a pipe holder, generally indicated at 212, configured to secure the utility pipe UP to the seismic clamp; a spacer, generally indicated at 214, configured to be disposed between the utility pipe and the rigid rod to inhibit the rigid rod from contacting the utility pipe when the utility pipe is secured to the seismic clamp; and a rod fitting, generally indicated at 216, configured to secure the seismic clamp to the rigid rod. This seismic clamp 210 is similar to the second seismic clamp 110, except as hereinafter described. The pipe holder 212 of the seismic clamp 210 does not bend to open and close the pipe holder, and the pipe holder has a generally arcuate bearing surface 220 for the utility pipe UP. Moreover, the tabs 229 of the spacer extend inward toward one another and downward from the second side wall 221 of the rod fitting 216 to define a generally V-shaped saddle for the utility pipe UP. The rigid rod RR and the utility pipe UP extend transverse (e.g., perpendicular) with respect to one another.

Figure 7:
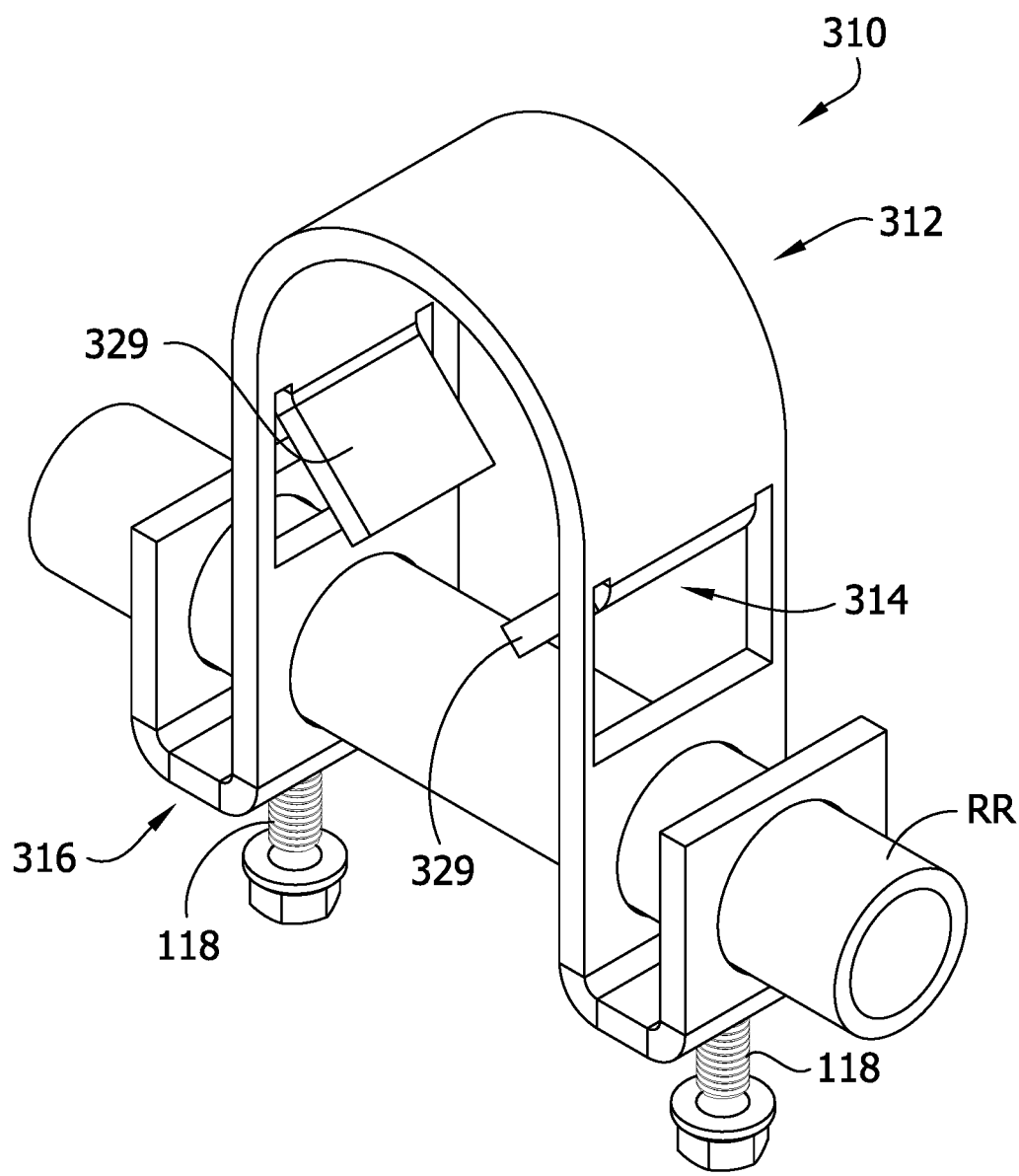
FIG. 7 is a perspective of a fourth embodiment of a seismic clamp constructed according to the teachings of the present disclosure.
Figure 8:
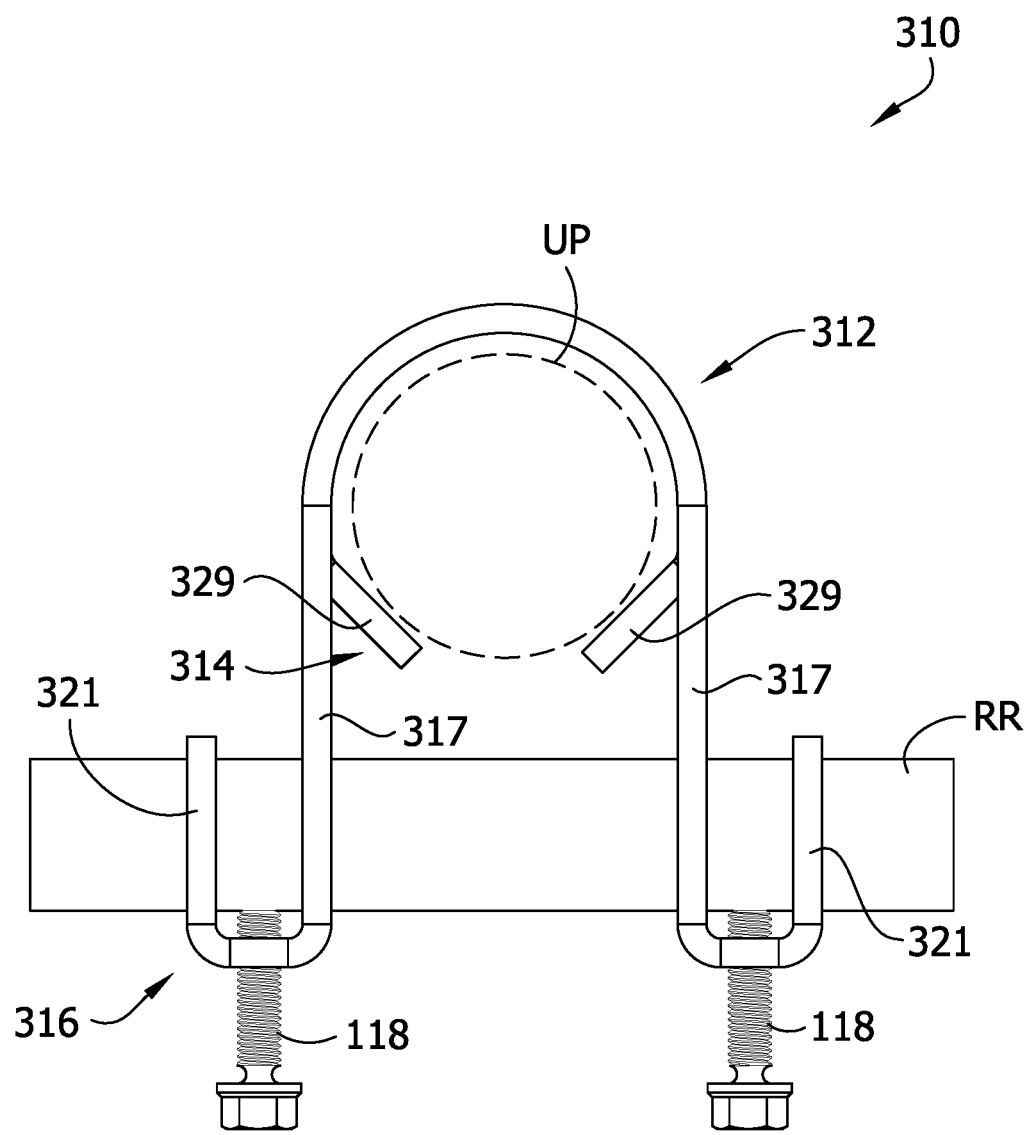
FIG. 8 is a front elevation of the seismic clamp of FIG. 7.

Referring to FIGS. 7 and 8, a fourth embodiment of the seismic clamp for bracing a non-structural component, such as the utility pipe UP, to the rigid rod RR within a building is generally indicated at reference numeral 310. The seismic clamp 310 generally includes a pipe holder, generally indicated at 312, configured to secure the utility pipe UP to the seismic clamp; a spacer, generally indicated at 314, configured to be disposed between the utility pipe and the rigid rod to inhibit the rigid rod from contacting the utility pipe when the utility pipe is secured to the seismic clamp; and a rod fitting, generally indicated at 316, configured to secure the seismic clamp to the rigid rod. This seismic clamp 310 is similar to the third seismic clamp 210, except as hereinafter described. The tabs 329 of the spacer 314 extend inward toward one another from the first side walls 317 of the respective arms of the rod fitting 316. Moreover, the second side walls 321 of the arms of the rod fitting 316 are outward of the corresponding first side walls 317 rather than inward thereof. The rigid rod RR and the utility pipe UP extend transverse (e.g., perpendicular) with respect to one another.

Figure 9:
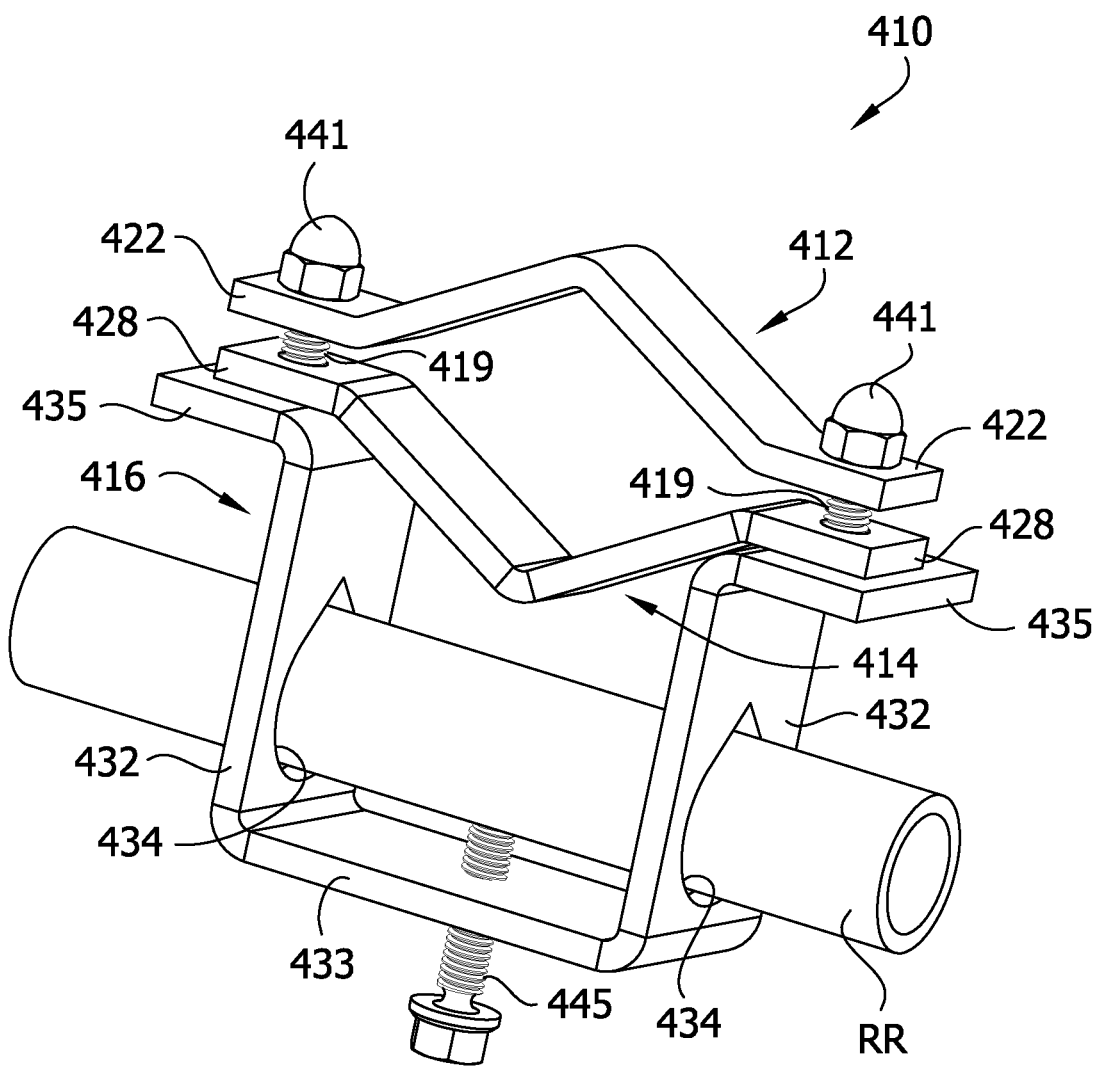
FIG. 9 is a perspective of a fifth embodiment of a seismic clamp constructed according to the teachings of the present disclosure.
Figure 10:
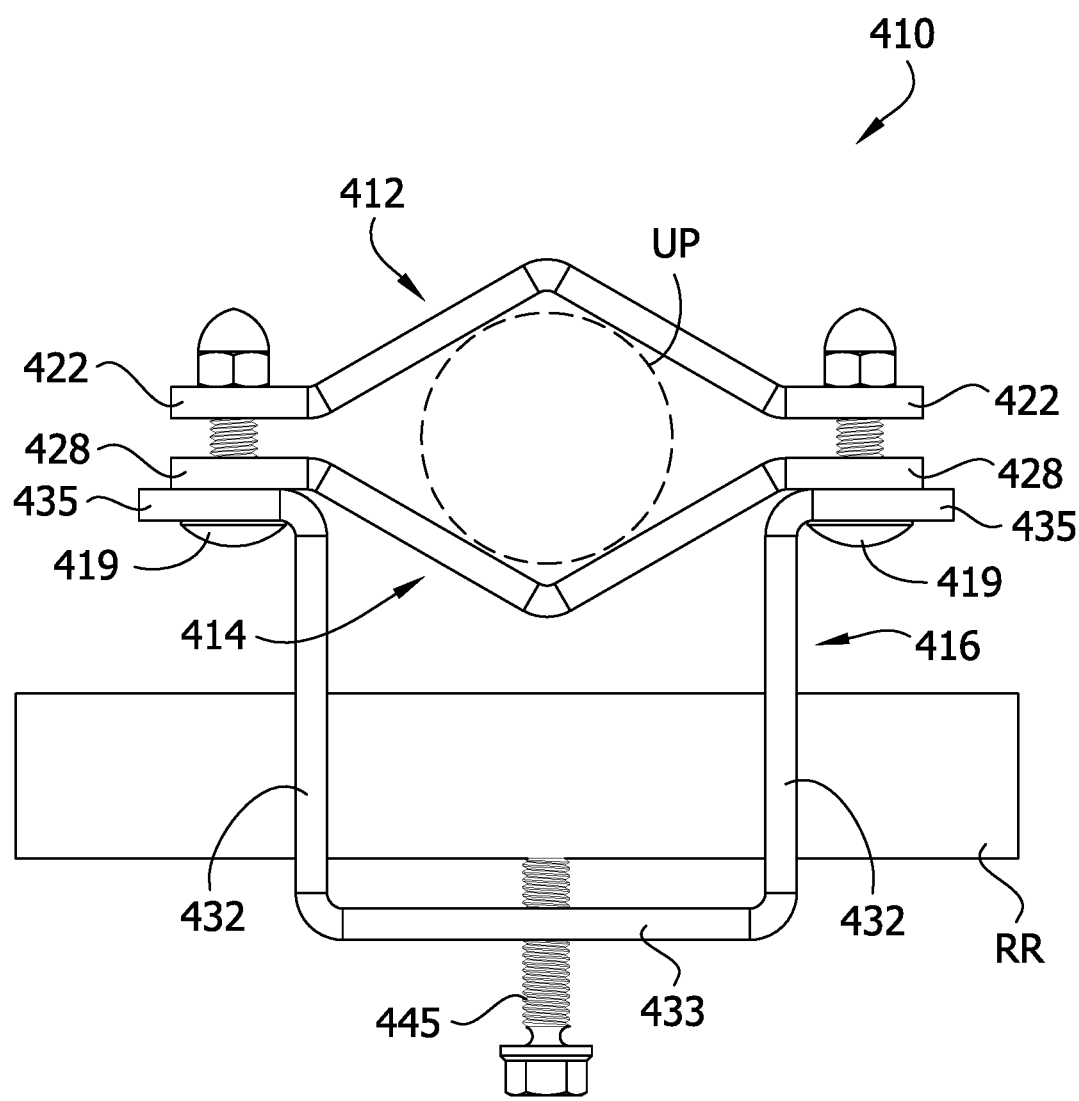
FIG. 10 is a front elevation of the seismic clamp of FIG. 9.

Referring to FIGS. 9 and 10, a fifth embodiment of the seismic clamp for bracing a non-structural component, such as the utility pipe UP, to the rigid rod RR within a building is generally indicated at reference numeral 410. The seismic clamp 410 generally includes a pipe holder, generally indicated at 412, configured to secure the utility pipe UP to the seismic clamp; a spacer, generally indicated at 414, configured to be disposed between the utility pipe and the rigid rod to inhibit the rigid rod from contacting the utility pipe when the utility pipe is secured to the seismic clamp; and a rod fitting, generally indicated at 416, configured to secure the seismic clamp to the rigid rod. This seismic clamp 410 is similar to the first seismic clamp 10, except as hereinafter described. The rod fitting 416 is channel-shaped including opposing first and second side walls 432 and a bottom wall 433 interconnecting the first and second side walls. Ears 435 at upper ends of the first and second side walls 432 are connected to the respective ears 422, 428 of the pipe holder 412 and the spacer 414 by fasteners 419 extending through aligned openings (e.g., non-threaded openings). Capped nuts 441 are threaded on the fasteners 419 to limit the tightening of the holder 412 on the utility pipe UP to limit the force applied to the utility pipe by the holder so that the holder does not deform, either plastically or elastically, the utility pipe, and in particular a plastic utility pipe (e.g., a CPVC pipe). Rod-receiving openings 434 in the first and second side walls 432 receive the rigid rod RR. A fastener 445 is threaded in a threaded opening in the bottom wall 433 of the rod fitting 416 and engages the rigid rod RR to function as a set screw to secure the brace 410 to the rigid rod. The rigid rod RR and the utility pipe UP extend transverse (e.g., perpendicular) with respect to one another.

Figure 11:
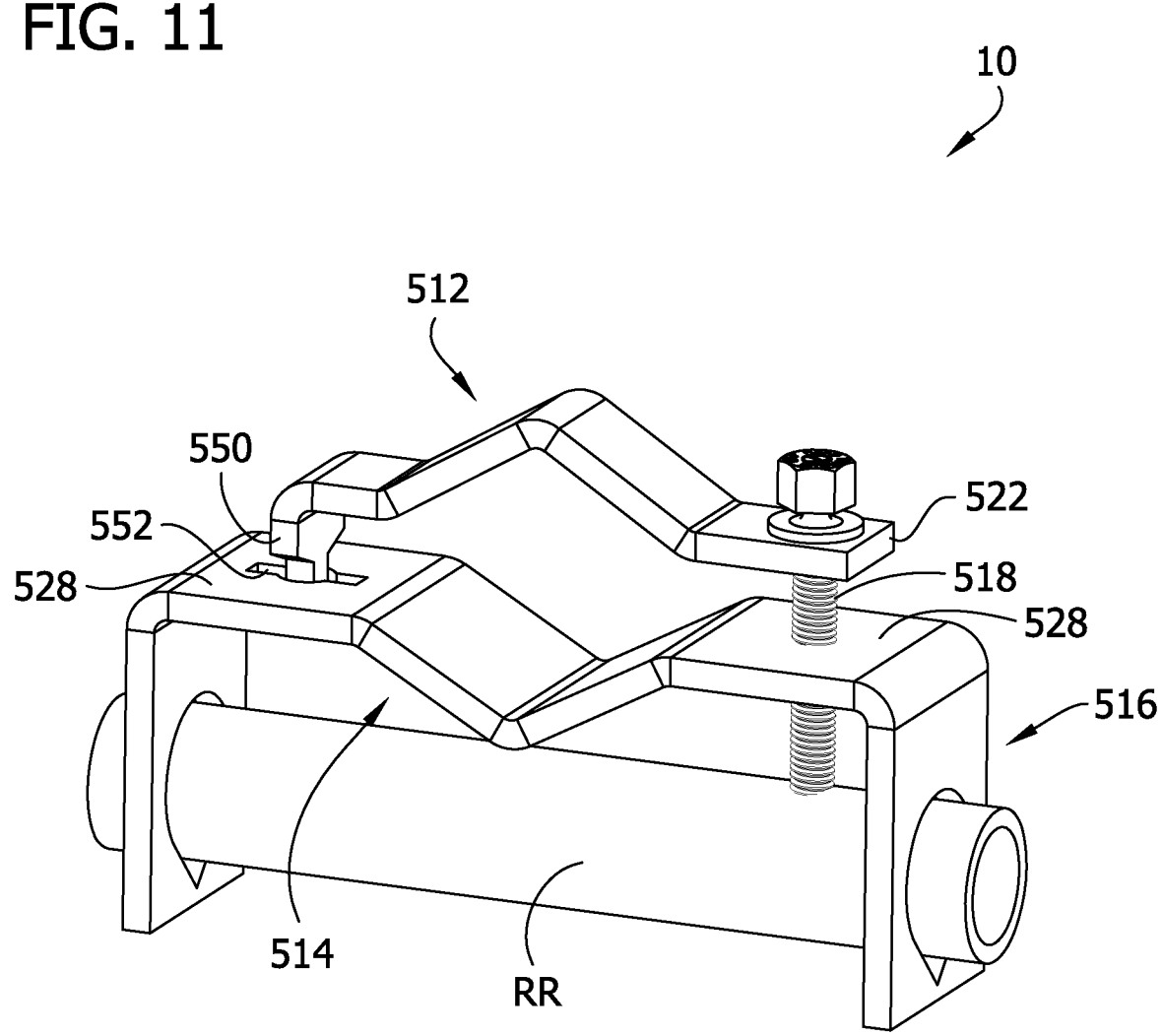
FIG. 11 is a perspective of a sixth embodiment of a seismic clamp constructed according to the teachings of the present disclosure.
Figure 12:
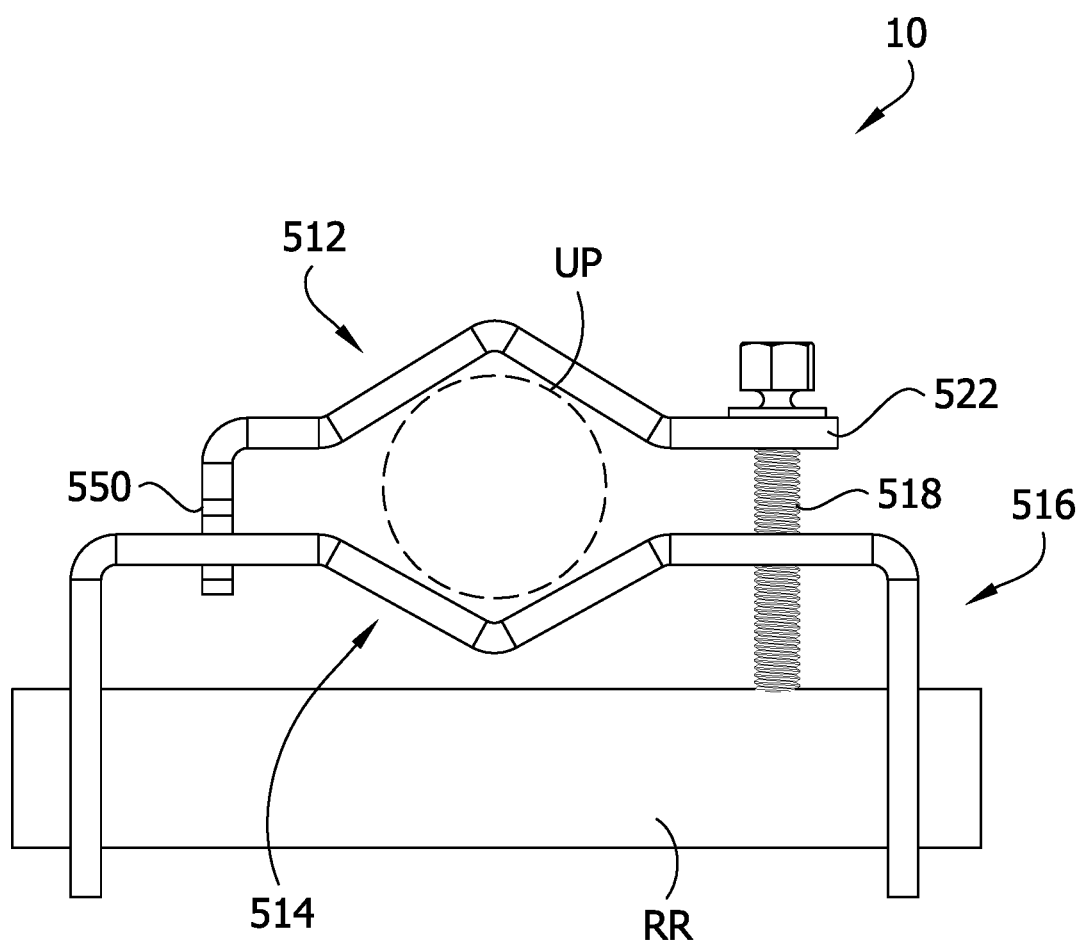
FIG. 12 is a front elevation of the seismic clamp of FIG. 11.

Referring to FIGS. 11 and 12, a sixth embodiment of the seismic clamp for bracing a non-structural component, such as the utility pipe UP, to the rigid rod RR within a building is generally indicated at reference numeral 510. The seismic clamp 510 generally includes a pipe holder, generally indicated at 512, configured to secure the utility pipe UP to the seismic clamp; a spacer, generally indicated at 514, configured to be disposed between the utility pipe and the rigid rod to inhibit the rigid rod from contacting the utility pipe when the utility pipe is secured to the seismic clamp; and a rod fitting, generally indicated at 516, configured to secure the seismic clamp to the rigid rod. This seismic clamp 510 is similar to the first seismic clamp 10, except as hereinafter described. The pipe holder 512 includes a keyed fitting 550 (e.g., a T-shaped fitting) at one of its ends opposite the end with an ear 522 through which the fasteners 518 is received and engages the rigid rod RR. The keyed fitting 550 is receivable in a slot 552 defined by one of the ears 528 of the spacer 514 when the keyed fitting is in a first orientation. After keyed fitting 550 is inserted in the slot 552, the pipe holder 512 can be rotated 90 degrees so that the opposite ear 522 defined by the pipe holder having an opening therethrough generally opposes the corresponding ear 528 of the spacer 514. The fastener 518 can then be tightened similar to the description set forth above with respect to the first embodiment so that the holder 512 does not deform, either plastically or elastically, the utility pipe, and in particular a plastic utility pipe (e.g., a CPVC pipe). The rigid rod RR and the utility pipe UP extend transverse (e.g., perpendicular) with respect to one another.

Figure 13:
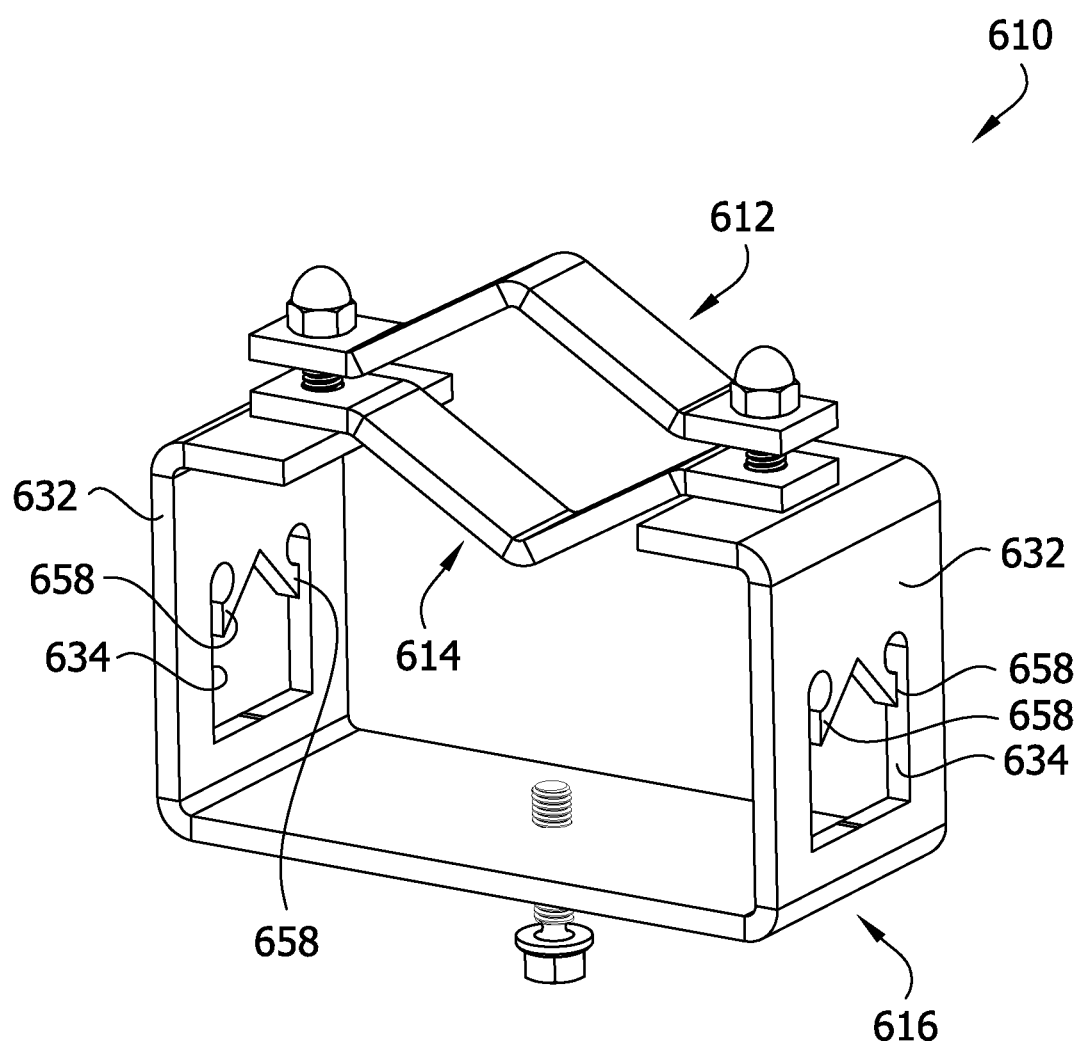
FIG. 13 is a perspective of a seventh embodiment of a seismic clamp constructed according to the teachings of the present disclosure.
Figure 14:
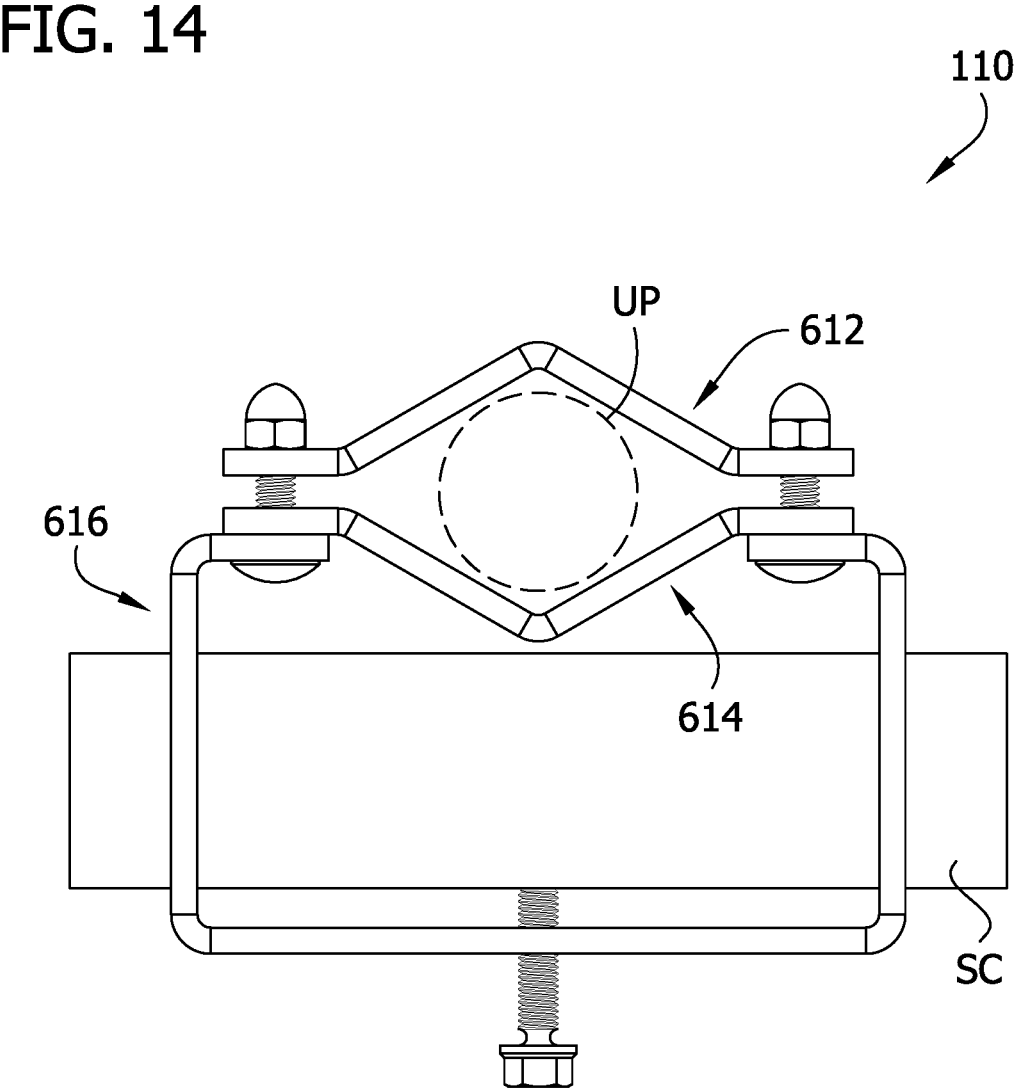
FIG. 14 is a front elevation of the seismic clamp of FIG. 13.

Referring to FIGS. 13 and 14, a seventh embodiment of the seismic clamp for bracing a non-structural component, such as the utility pipe UP, to the rigid rod RR within a building is generally indicated at reference numeral 610. The seismic clamp 610 generally includes a pipe holder, generally indicated at 612, configured to secure the utility pipe UP to the seismic clamp; a spacer, generally indicated at 614, configured to be disposed between the utility pipe and the rigid rod to inhibit the rigid rod from contacting the utility pipe when the utility pipe is secured to the seismic clamp; and a rod fitting, generally indicated at 616, configured to secure the seismic clamp to the rigid rod. This seismic clamp 610 is similar to the fifth seismic clamp 410, except as hereinafter described. The rod openings 634 defined by the opposing first and second side walls 632 of the rod fitting 616 are configured to selectively receive therein a rigid rod having a circular cross section, as shown in the previous embodiments, or a rigid rod in the form of a strut channel SC, as illustrated in FIGS. 13 and 14, to be secured to the brace 610. The side walls 632 each includes a retainer having two prongs 658 extending into the corresponding opening 634. The retainer prongs 658 are received in the open interior of the strut channel and engage the inturned lips defining the open slot of the strut channel when the strut channel is received in the opening 634 to capture the strut channel in the opening. The retainer prongs define a V-shaped space suitable for receiving and bearing a rigid rod having a circular cross section.

Figure 15:
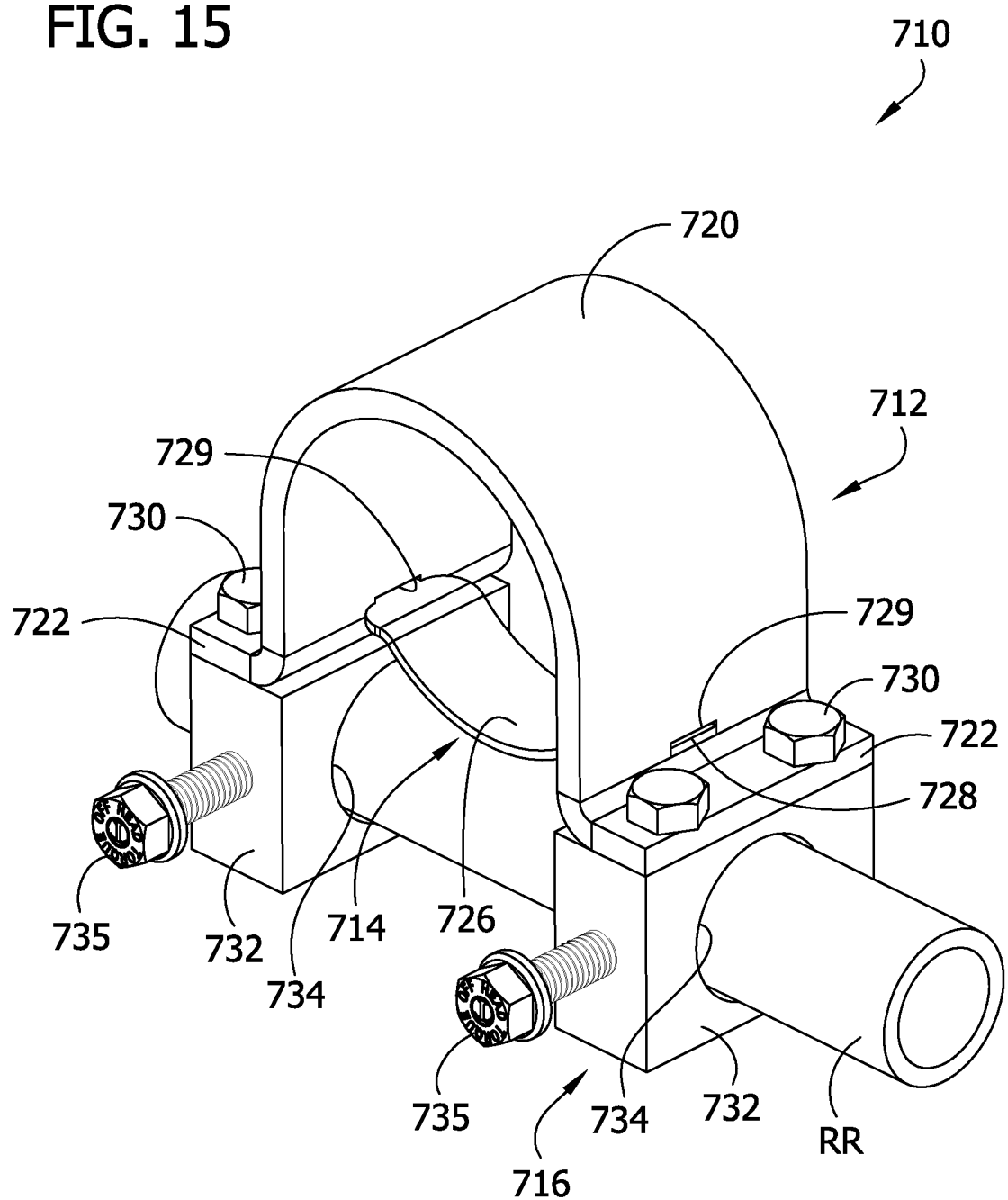
FIG. 15 is a perspective of a eighth embodiment of a seismic clamp constructed according to the teachings of the present disclosure.
Figure 16:
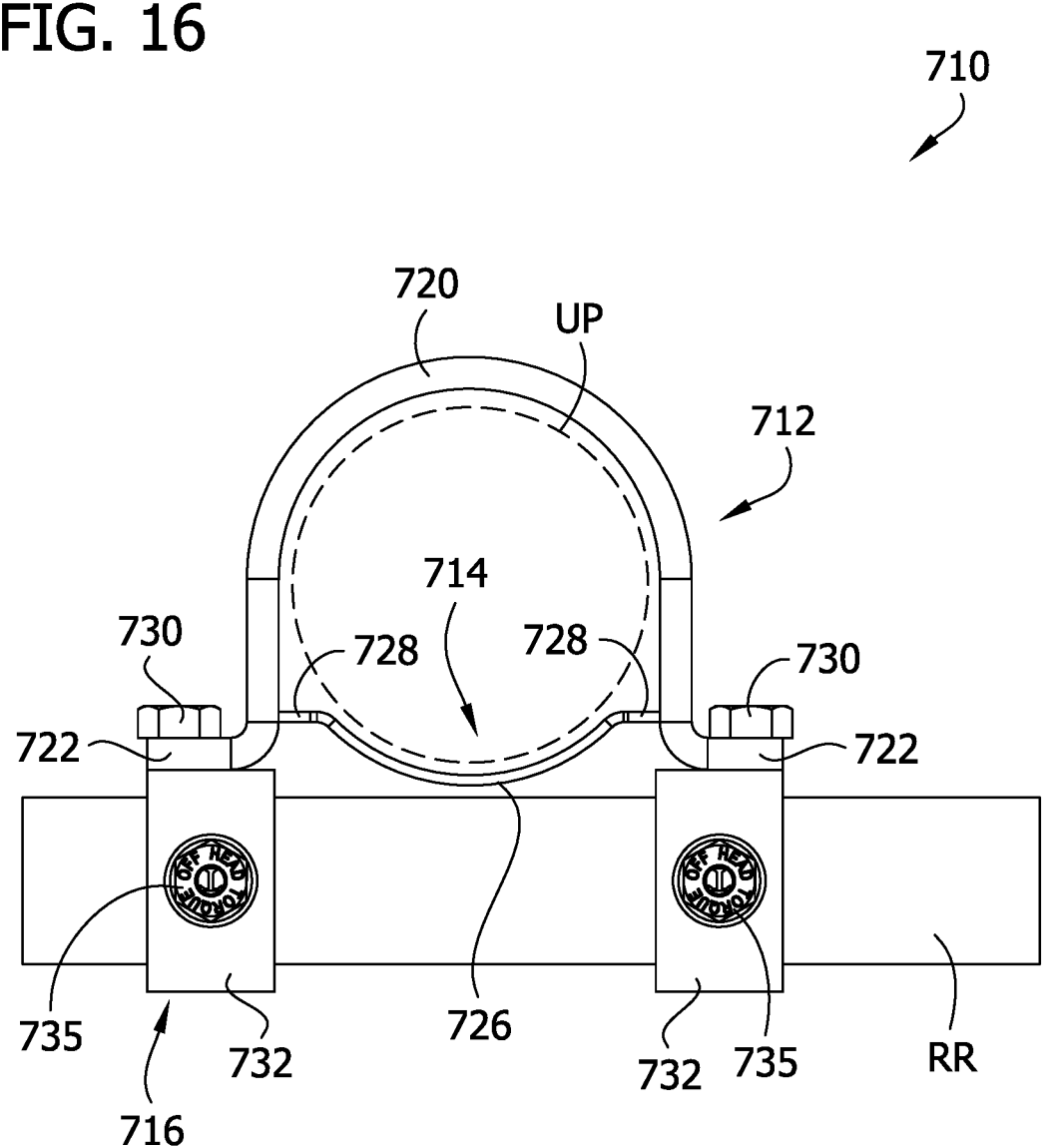
FIG. 16 is a front elevation of the seismic clamp of FIG. 15.

Referring to FIGS. 15 and 16, an eighth embodiment of the seismic clamp for bracing a non-structural component, such as the utility pipe UP, to the rigid rod RR within a building is generally indicated at reference numeral 710. The seismic clamp 710 generally includes a pipe holder, generally indicated at 712, configured to secure the utility pipe UP to the seismic clamp; a spacer, generally indicated at 714, configured to be disposed between the utility pipe and the rigid rod to inhibit the rigid rod from contacting the utility pipe when the utility pipe is secured to the seismic clamp; and a rod fitting, generally indicated at 716, configured to secure the seismic clamp to the rigid rod.

Referring still to FIGS. 15 and 16, the pipe holder 712 comprises a strap including a generally arcuate central portion 720 defining a bearing surface sized and shaped to extend partially around the circumference of the utility pipe UP, and opposite first and second ears 722 extending outward from opposite ends of the central portion. The strap may be formed from a flat piece of metal or other material. The spacer 714 includes a saddle 726 defining bearing surface on which the utility pipe UP is supported, and opposite first and second ears 728 extending outward from opposite ends of the saddle. The saddle 726 generally opposes the central portion 720 of the pipe holder 712. The first and second ears 728 of the spacer 714 are received in openings 729 (e.g., slot shaped openings) in the pipe holder 712 generally adjacent the ears 722 of the pipe holder to secure the utility pipe UP between the holder and the spacer. The pipe holder 712 is secured to the rod fitting 716 by fasteners 730 (e.g., bolts) extending through the first and second ears 722 and threaded into the rod fitting.

The illustrated rod fitting 716 includes opposing first and second opposing arms 732. In the illustrated embodiment, the first and second opposing arms 732 are generally in the form of blocks defining rod-receiving openings 734 extending through the arms 732 such that the rigid rod RR extends generally transverse (e.g., perpendicular) to the utility pipe UP. Fasteners 735 (e.g., bolts) extend through the opposing arms 732 of the rod fitting 716 engage the rigid rod RR within the rod-receiving openings 734. The arms 732 include bearing surfaces partially defining the rod-receiving openings 734 that support the rigid rod RR. The fasteners 735 function as set screws pressing the rigid rod RR against the bearing surfaces to secure the fitting 716 to the rigid rod RR. Through this arrangement, the rigid rod RR and the utility pipe UP extend transverse (e.g., perpendicular) with respect to one another.

In the illustrated embodiment, the brace 710 is configured to limit the force applied to the utility pipe UP by the holder 712 so that the holder does not deform, either plastically or elastically, the utility pipe, and in particular a plastic utility pipe (e.g., a CPVC pipe). In other words, the outer dimension of the utility pipe at the location where it is being secured by the holder does not change during or after securement. In the illustrated embodiment, the pipe holder 720 and the spacer 714 are sized and shaped to a particular utility pipe having a selected size and shape so that the holder does not deform, either plastically or elastically, the utility pipe.

Figure 17:
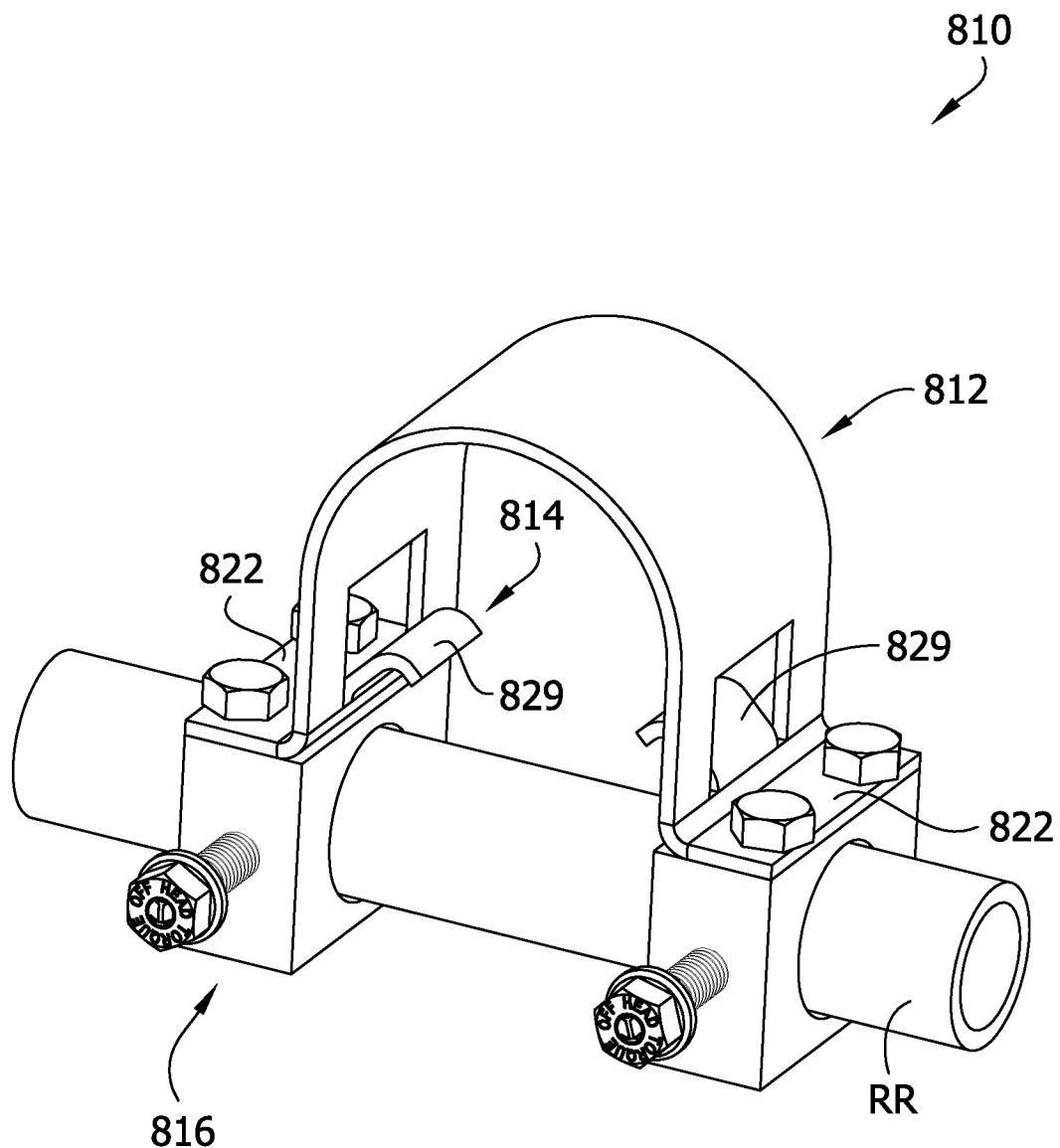
FIG. 17 is a perspective of a ninth embodiment of a seismic clamp constructed according to the teachings of the present disclosure.
Figure 18:
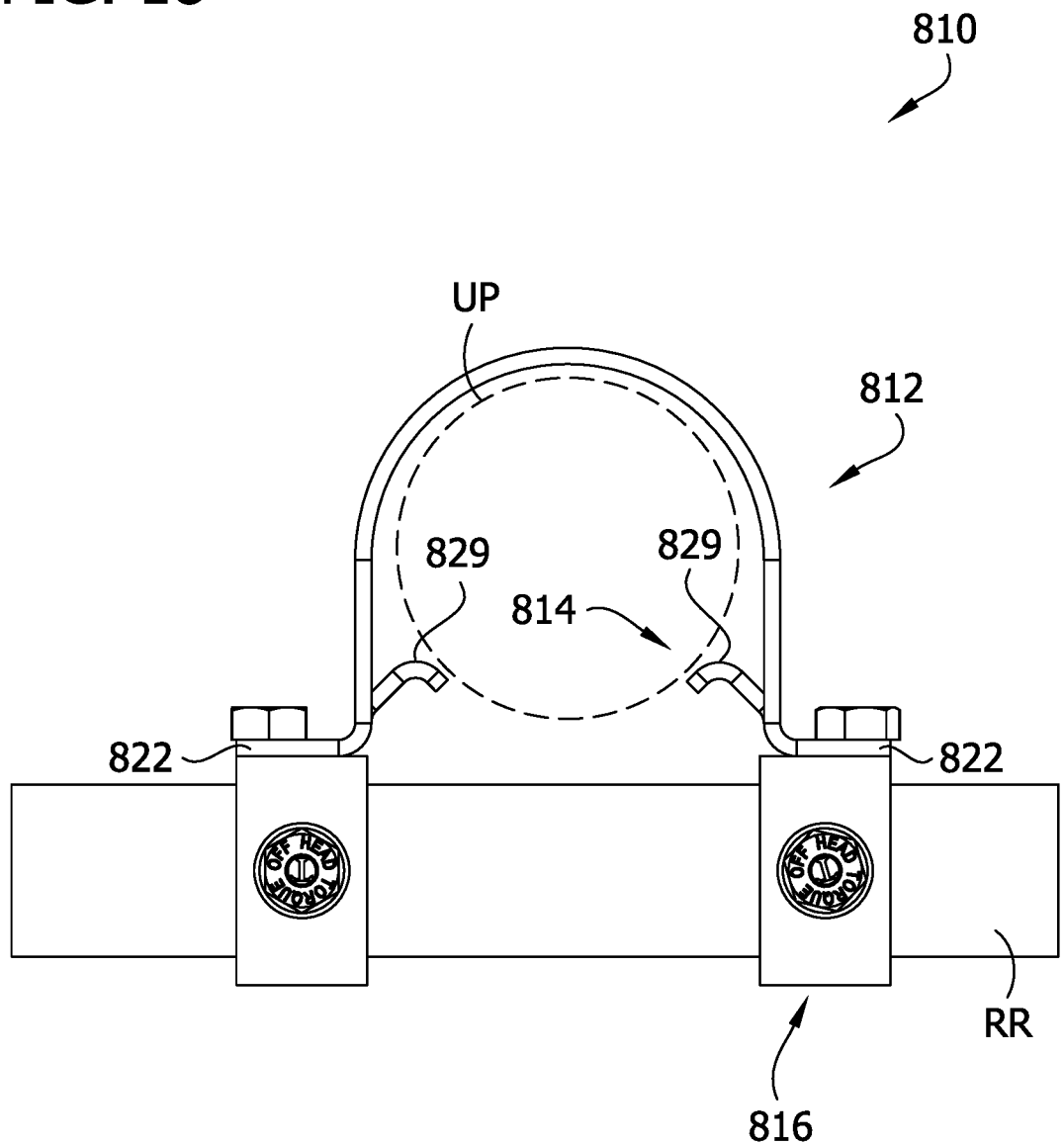
FIG. 18 is a front elevation of the seismic clamp of FIG. 17.

Referring to FIGS. 17 and 18, a ninth embodiment of the seismic clamp for bracing a non-structural component, such as the utility pipe UP, to the rigid rod RR within a building is generally indicated at reference numeral 810. The seismic clamp 810 generally includes a pipe holder, generally indicated at 812, configured to secure the utility pipe UP to the seismic clamp; a spacer, generally indicated at 814, configured to be disposed between the utility pipe and the rigid rod to inhibit the rigid rod from contacting the utility pipe when the utility pipe is secured to the seismic clamp; and a rod fitting, generally indicated at 816, configured to secure the seismic clamp to the rigid rod. This seismic clamp 810 is similar to the eighth seismic clamp 710, except as hereinafter described. The spacer 814 includes first and second tabs 829 extending inward from adjacent the respective first and second ears 822 of the pipe holder 812. The tabs 829 define the bearing surface for supporting the utility pipe UP in spaced relationship with the rigid rod RR.

Figure 19:
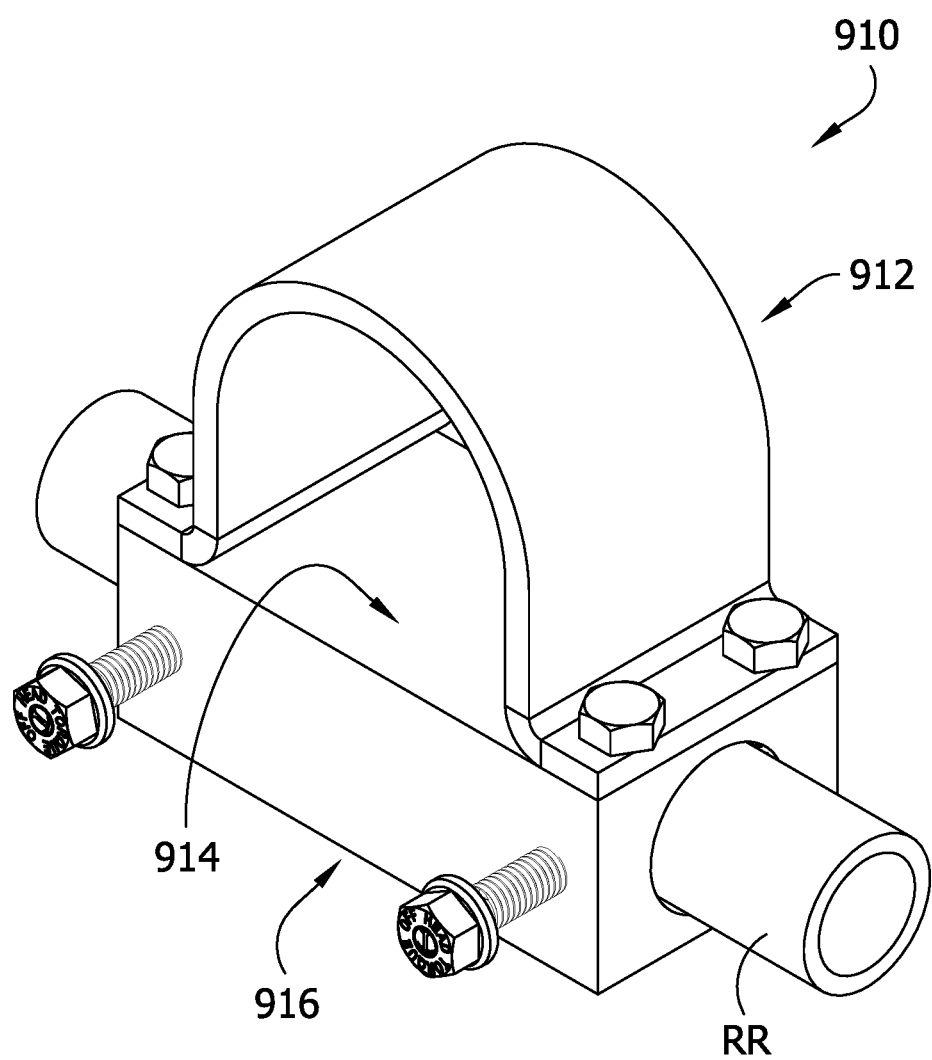
FIG. 19 is a perspective of a tenth embodiment of a seismic clamp constructed according to the teachings of the present disclosure.
Figure 20:
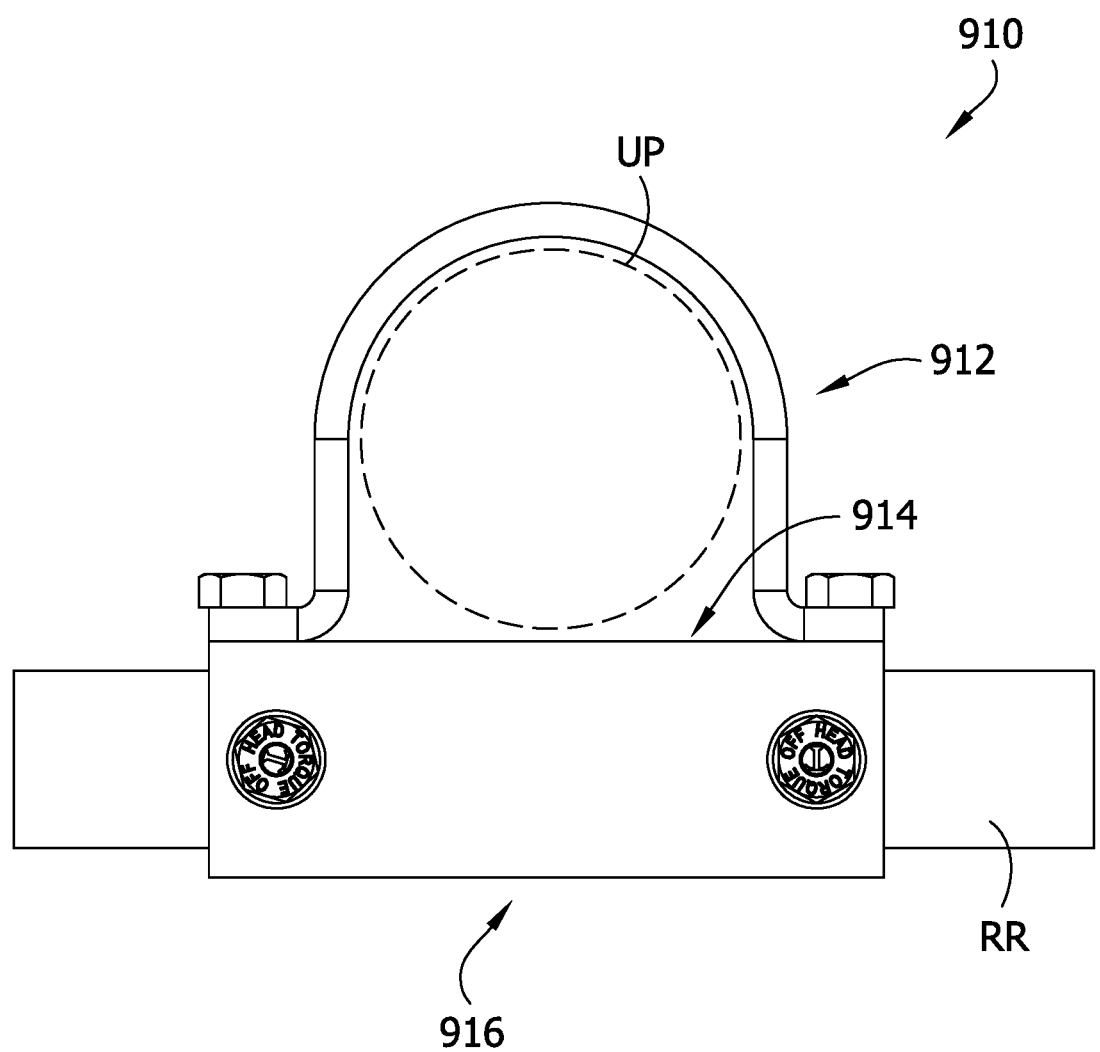
FIG. 20 is a front elevation of the seismic clamp of FIG. 19.

Referring to FIGS. 19 and 20, a tenth embodiment of the seismic clamp for bracing a non-structural component, such as the utility pipe UP, to the rigid rod RR within a building is generally indicated at reference numeral 910. The seismic clamp 910 generally includes a pipe holder, generally indicated at 912, configured to secure the utility pipe UP to the seismic clamp; a spacer, generally indicated at 914, configured to be disposed between the utility pipe and the rigid rod to inhibit the rigid rod from contacting the utility pipe when the utility pipe is secured to the seismic clamp; and a rod fitting, generally indicated at 916, configured to secure the seismic clamp to the rigid rod. This seismic clamp 910 is similar to the eighth seismic clamp 710, except as hereinafter described. The rod fitting 916 is formed as a single, elongate block having an upper surface opposing the pipe holder 912 and defining the spacer 914, in particular, the bearing surface of the spacer. Thus, the spacer 914 and the rod fitting 916 are integrally formed as a one-piece component.

Figure 21:
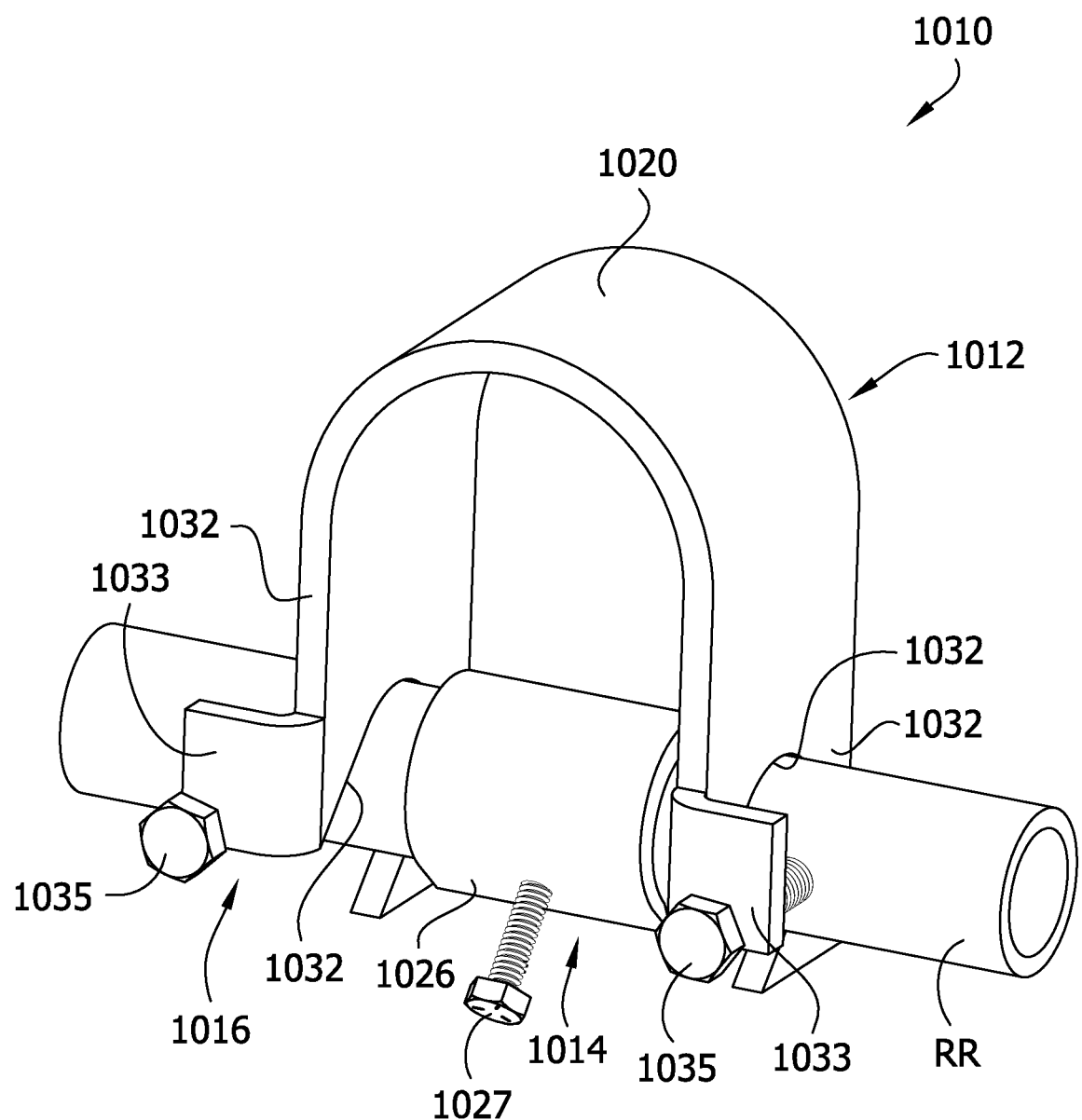
FIG. 21 is a perspective of a eleventh embodiment of a seismic clamp constructed according to the teachings of the present disclosure.
Figure 22:
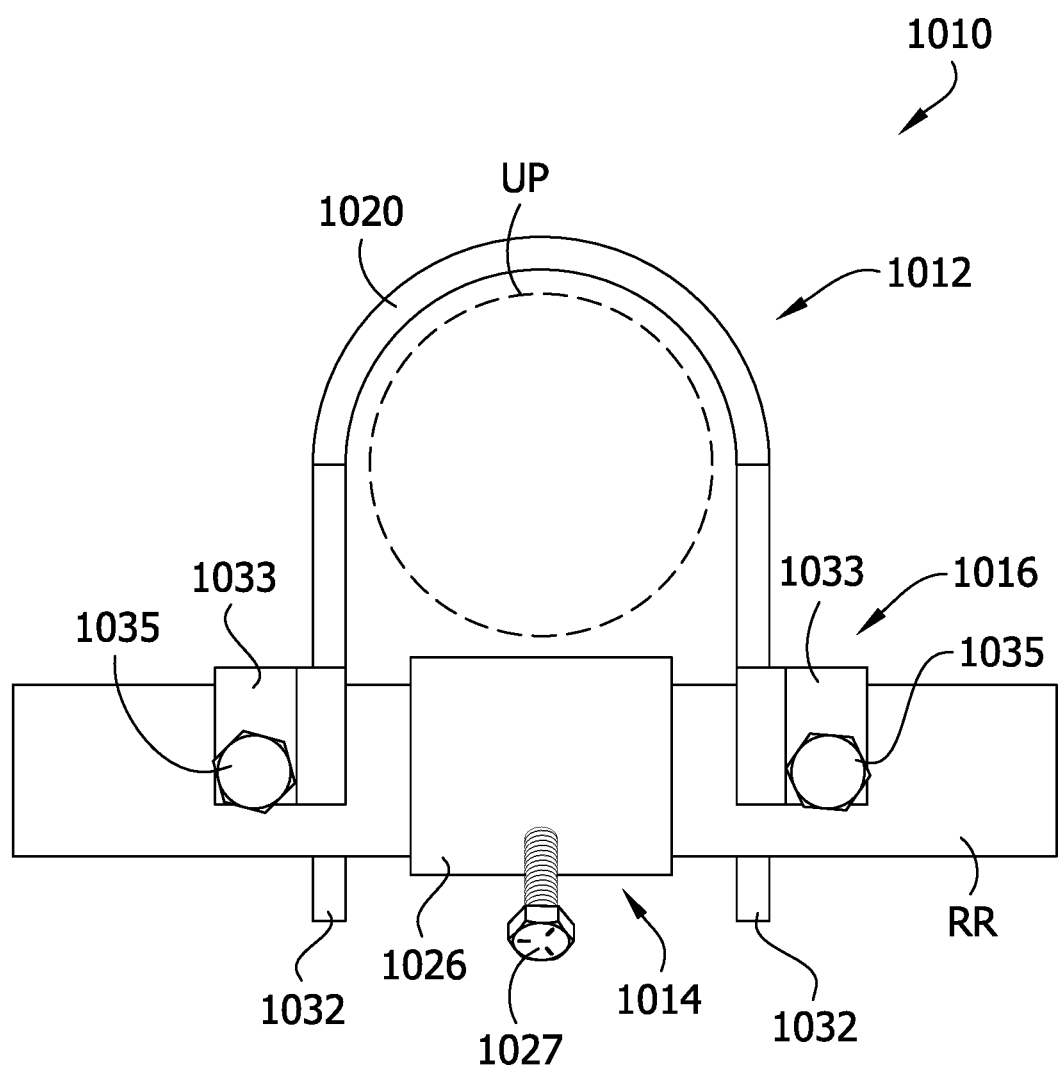
FIG. 22 is a front elevation of the seismic clamp of FIG. 21.
Figure 23:
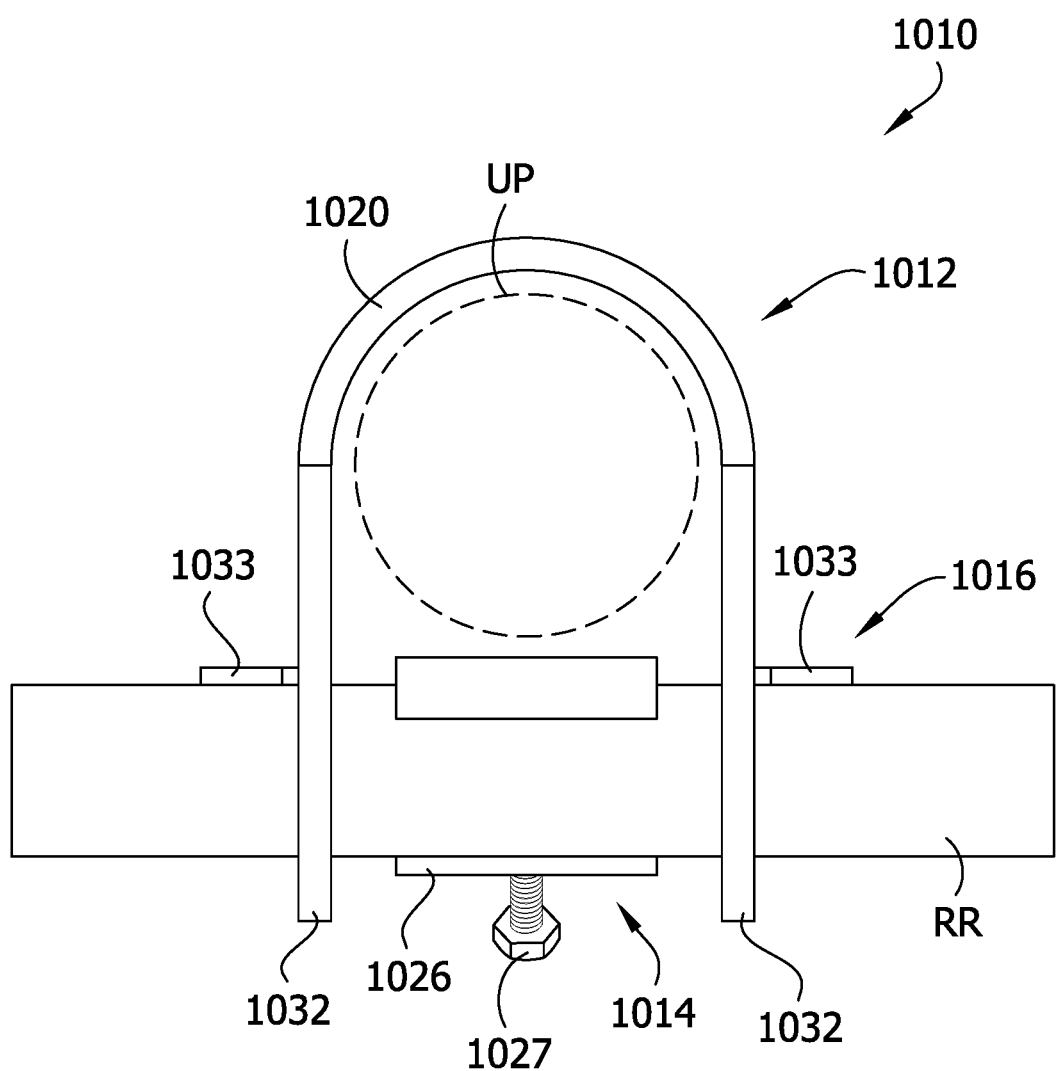
FIG. 23 is a rear elevation of the seismic clamp of FIG. 21.

Referring to FIGS. 21-23, an eleventh embodiment of the seismic clamp for bracing a non-structural component, such as the utility pipe UP, to the rigid rod RR within a building is generally indicated at reference numeral 1010. The seismic clamp 1010 generally includes a pipe holder, generally indicated at 1012, configured to secure the utility pipe UP to the seismic clamp; a spacer, generally indicated at 1014, configured to be disposed between the utility pipe and the rigid rod to inhibit the rigid rod from contacting the utility pipe when the utility pipe is secured to the seismic clamp; and a rod fitting, generally indicated at 1016, configured to secure the seismic clamp to the rigid rod.

Referring still to FIGS. 21-23, the pipe holder 1012 comprises a strap including a generally arcuate central portion 1020 defining a bearing surface sized and shaped to extend partially around the circumference of the utility pipe UP. The strap may be formed from a flat piece of metal or other material. The spacer 1014 includes a sleeve 1026 defining bearing surface on which the utility pipe UP is supported. The sleeve 1026 is secured to the rigid rod RR by a fastener 1027 functioning as a set screw. The sleeve 1026 generally opposes the central portion 1020 of the pipe holder 1012.

The illustrated rod fitting 1016 includes opposing first and second arms 1032 extending from opposite ends of the pipe holder 1012 and integrally formed therewith. The first and second arms rod-receiving openings 1034 extend through the arms 1032 such that the rigid rod RR extends generally transverse (e.g., perpendicular) to the utility pipe UP. Fasteners 1035 (e.g., bolts) extend through first and second ears 1033 of the rod fitting 1016 engage the rigid rod RR within the rod-receiving openings 1034. The arms 1032 include bearing surfaces partially defining the rod-receiving openings 1034 that support the rigid rod RR. The fasteners 1035 function as set screws pressing the rigid rod RR against the bearing surfaces to secure the fitting 1016 to the rigid rod RR. Through this arrangement, the rigid rod RR and the utility pipe UP extend transverse (e.g., perpendicular) with respect to one another.

In the illustrated embodiment, the brace 1010 is configured to limit the force applied to the utility pipe UP by the holder 1012 so that the holder does not deform, either plastically or elastically, the utility pipe, and in particular a plastic utility pipe (e.g., a CPVC pipe). In other words, the outer dimension of the utility pipe UP at the location where it is being secured by the holder 1012 does not change during or after securement. In the illustrated embodiment, the pipe holder 1020 and the spacer 1014 are sized and shaped to a particular utility pipe having a selected size and shape so that the holder does not deform, either plastically or elastically, the utility pipe.

Figure 24:
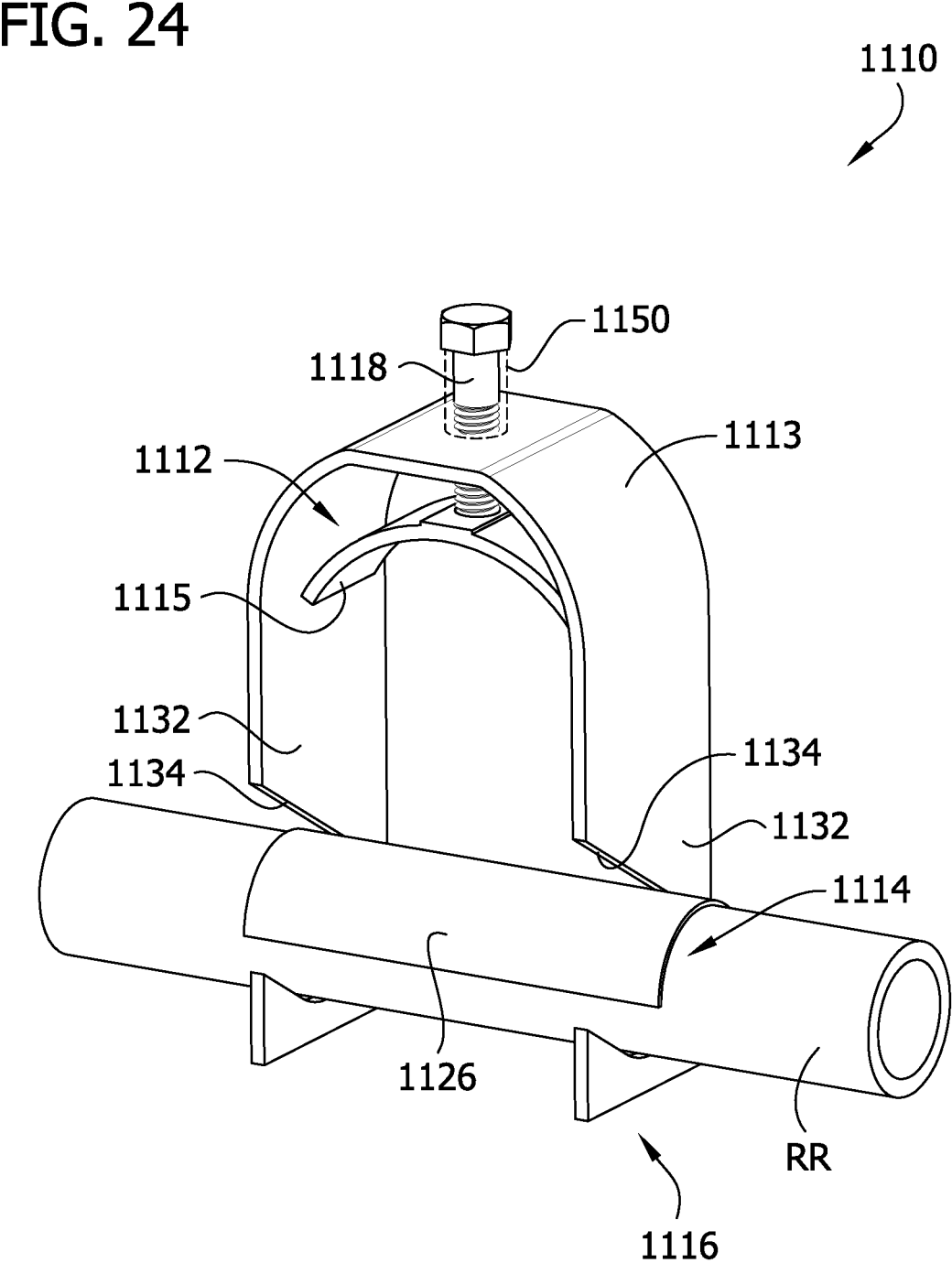
FIG. 24 is a perspective of a twelfth embodiment of a seismic clamp constructed according to the teachings of the present disclosure.
Figure 25:
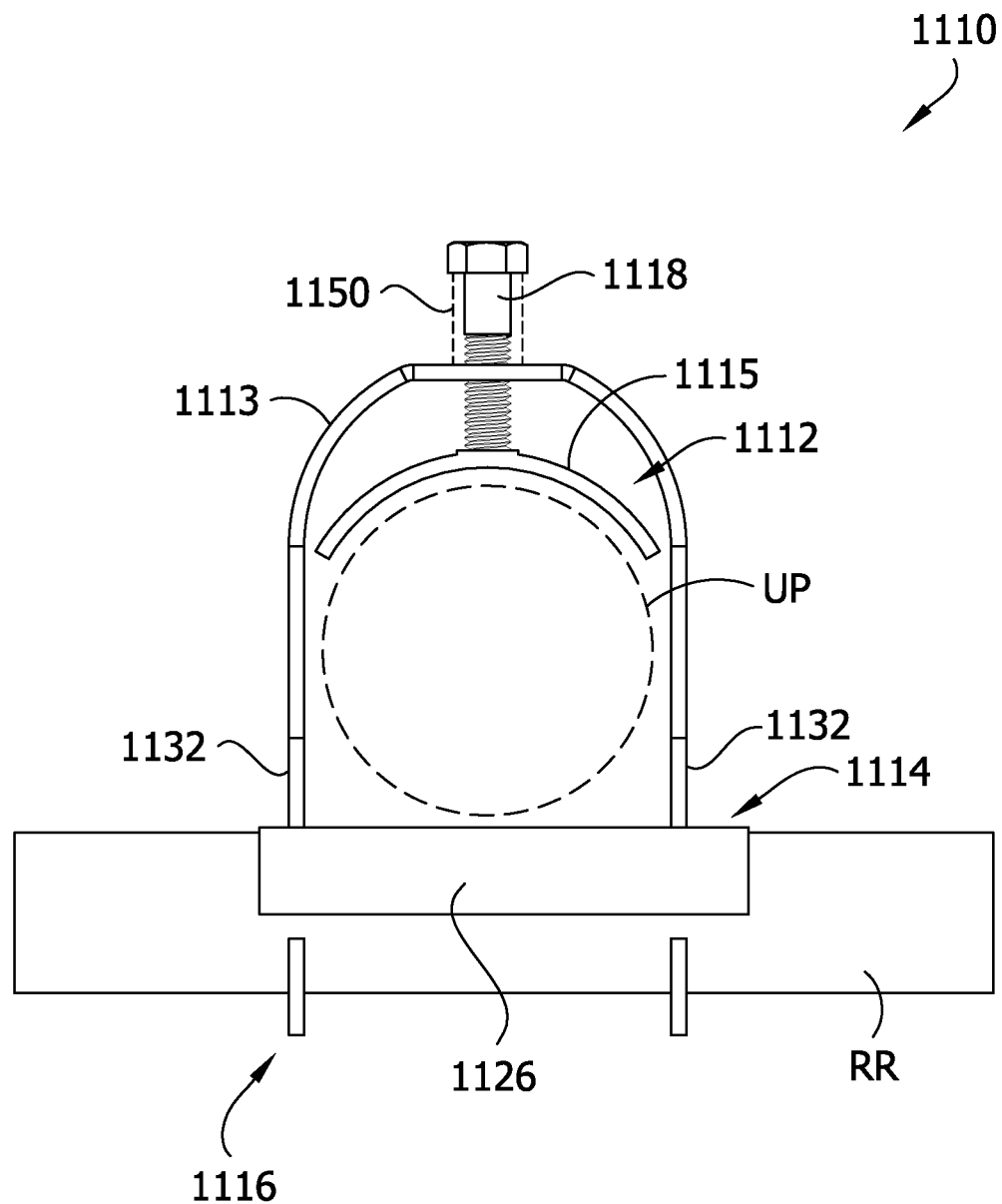
FIG. 25 is a front elevation of the seismic clamp of FIG. 24.

Referring to FIGS. 24 and 25, a twelfth embodiment of the seismic clamp for bracing a non-structural component, such as the utility pipe UP, to the rigid rod RR within a building is generally indicated at reference numeral 1110. The seismic clamp 1110 generally includes a pipe holder, generally indicated at 1112, configured to secure the utility pipe UP to the seismic clamp; a spacer, generally indicated at 1114, configured to be disposed between the utility pipe UP and the rigid rod RR to inhibit the rigid rod RR from contacting the utility pipe UP when the utility pipe UP is secured to the seismic clamp; and a rod fitting, generally indicated at 1116, configured to secure the seismic clamp to the rigid rod RR.

Referring still to FIGS. 24 and 25, the pipe holder 1112 comprises an outer upper member 1113 and a strap 1115 having an arcuate shape and defining a bearing surface sized and shaped to extend partially around the circumference of the utility pipe UP. The strap 1115 is inward of the upper member 1113. A fastener 1118 is threadably received in the upper member 1113 and connected to the strap 1115 so that tightening of the fastener 1118 moves the strap 1115 relative to the upper member and toward the spacer 1114. The spacer 1114 includes a sleeve 1126 defining bearing surface on which the utility pipe UP is supported. The sleeve 1126 is received on the rigid pipe RR and at least partially surrounds the circumference of the rigid rod RR. The sleeve 1026 generally opposes the central portion 1120 of the pipe holder 1112.

The illustrated rod fitting 1116 includes opposing first and second arms 1132 extending from opposite ends of the upper member 1113 of the pipe holder 1112 and integrally formed therewith. First and second arms rod-receiving openings 1134 extend through the arms 1132 such that the rigid rod RR extends generally transverse (e.g., perpendicular) to the utility pipe UP. Through this arrangement, the rigid rod RR and the utility pipe UP extend transverse (e.g., perpendicular) with respect to one another.

In the illustrated embodiment, the brace 1110 is configured to limit the force applied to the utility pipe UP by the holder 1112 so that the holder does not deform, either plastically or elastically, the utility pipe, and in particular a plastic utility pipe (e.g., a CPVC pipe). In other words, the outer dimension of the utility pipe UP at the location where it is being secured by the holder 1112 does not change during or after securement. In the illustrated embodiment, a stop in the form of a sleeve 1150 is received on the bolt 1118 between the bolt head and the upper member 1113 to restrict movement of the strap 1115 toward the spacer 1114, to thereby restrict the force applied to the utility pipe UP positioned between the strap and the spacer.

Figure 26:
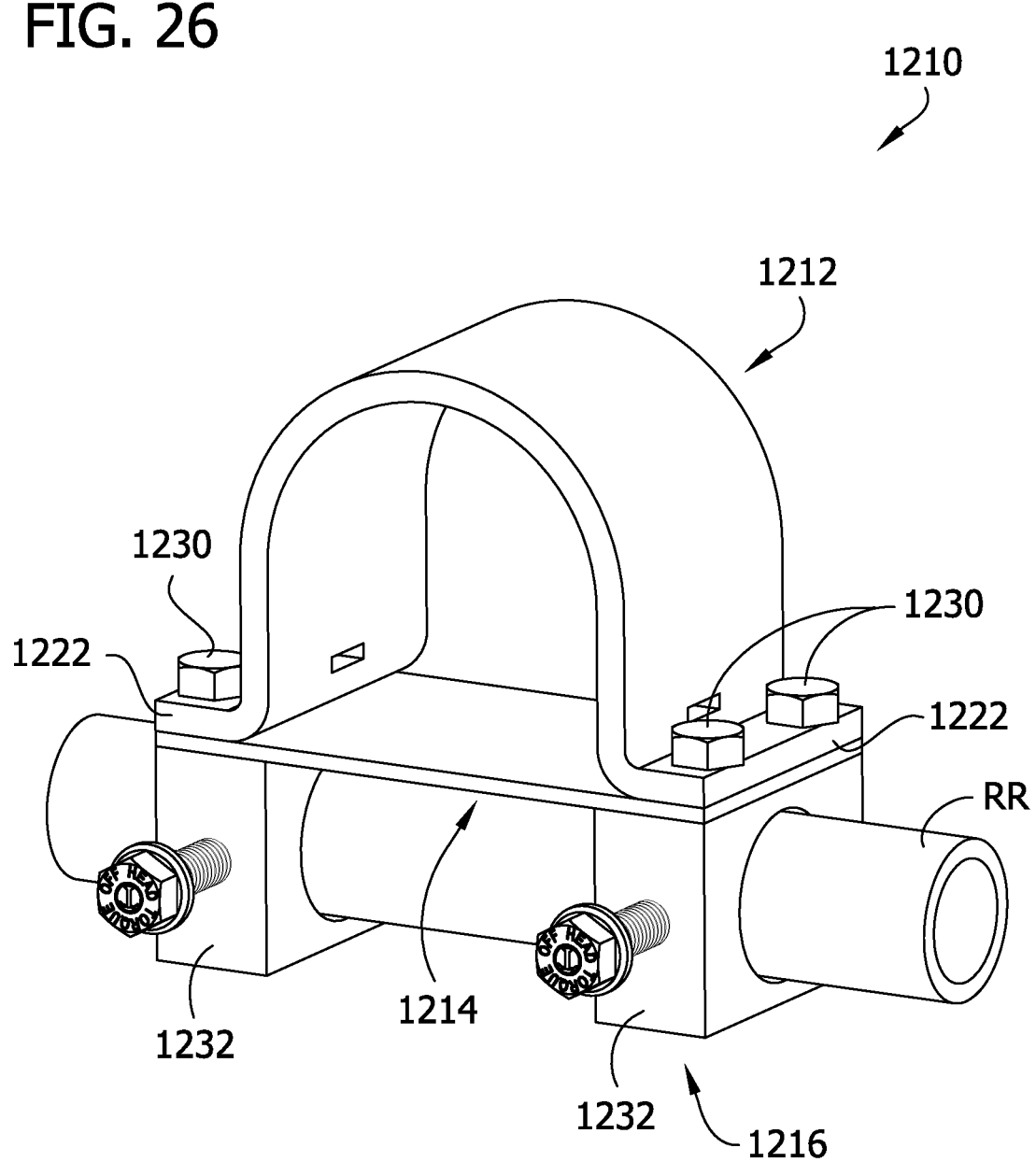
FIG. 26 is a perspective of a thirteenth embodiment of a seismic clamp constructed according to the teachings of the present disclosure.
Figure 27:
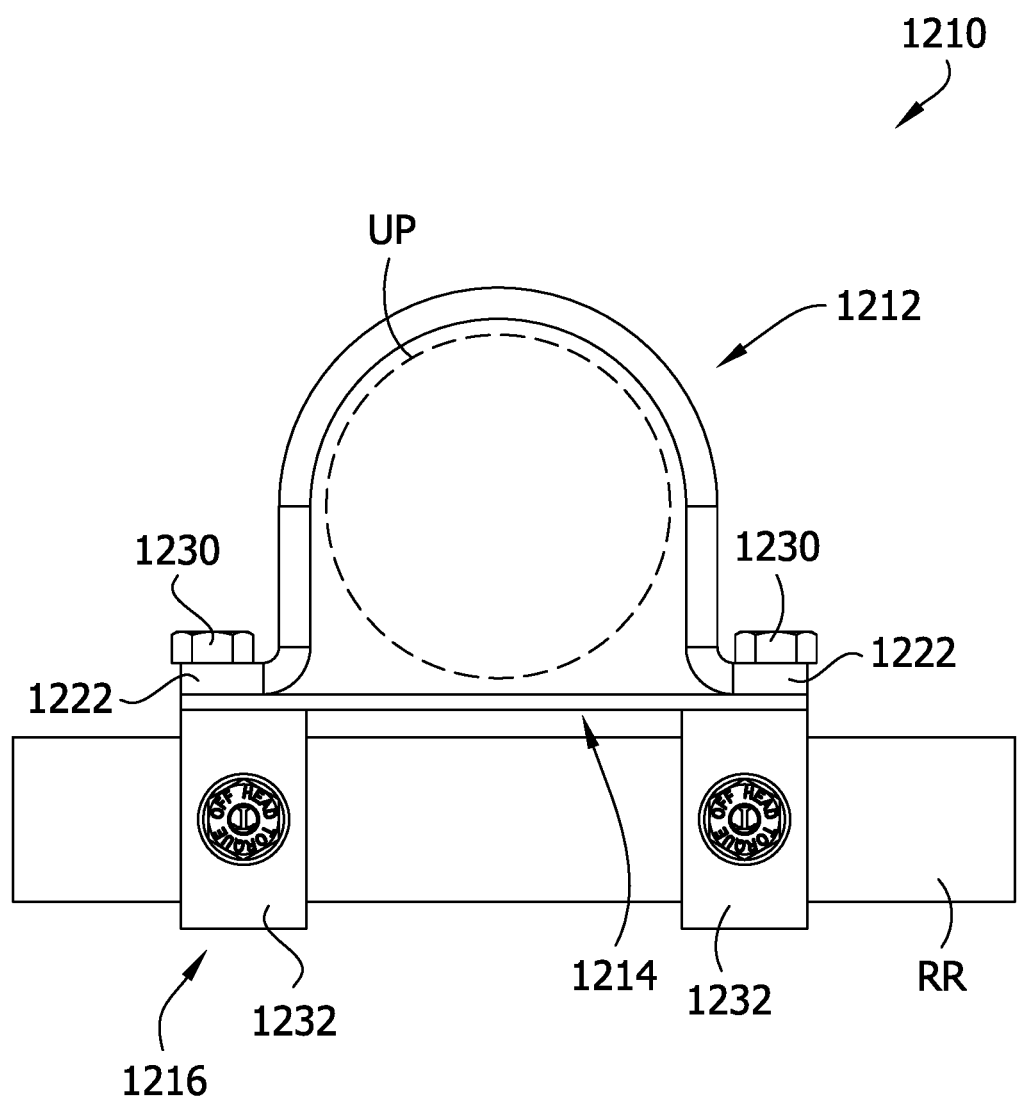
FIG. 27 is a front elevation of the seismic clamp of FIG. 26.

Referring to FIGS. 26 and 27, a thirteenth embodiment of the seismic clamp for bracing a non-structural component, such as the utility pipe UP, to the rigid rod RR within a building is generally indicated at reference numeral 1210. The seismic clamp 1210 generally includes a pipe holder, generally indicated at 1212, configured to secure the utility pipe UP to the seismic clamp; a spacer, generally indicated at 1214, configured to be disposed between the utility pipe and the rigid rod to inhibit the rigid rod from contacting the utility pipe when the utility pipe is secured to the seismic clamp; and a rod fitting, generally indicated at 1216, configured to secure the seismic clamp to the rigid rod. This seismic clamp 1210 is similar to the eighth seismic clamp 710, except as hereinafter described. The spacer 1214 comprises a plate that is secured between the first and second ears 1222 of the pipe holder 1212 and the first and second opposing arms 1232 by the fasteners 1230.

Figure 28:
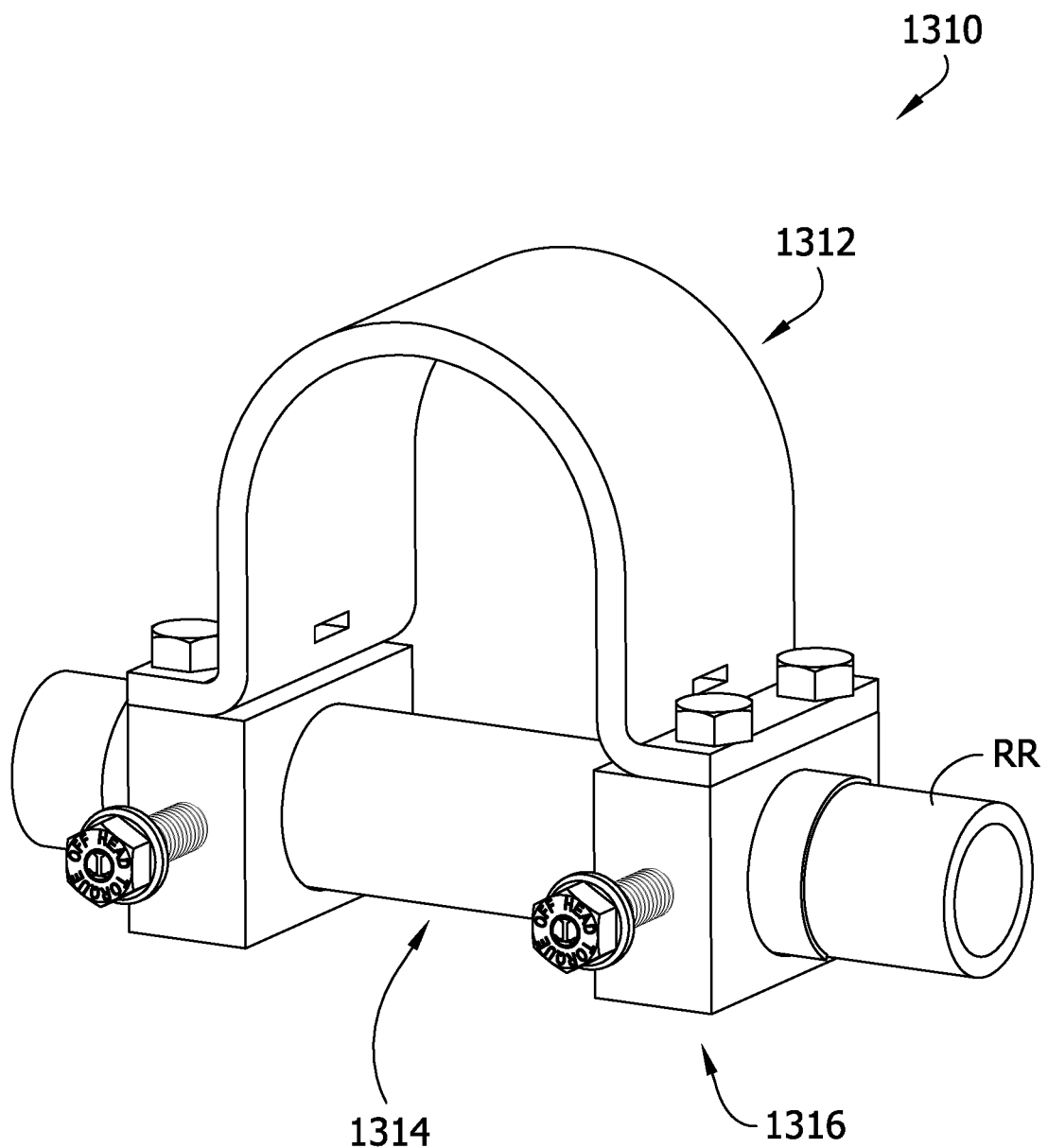
FIG. 28 is a perspective of a fourteenth embodiment of a seismic clamp constructed according to the teachings of the present disclosure.
Figure 29:
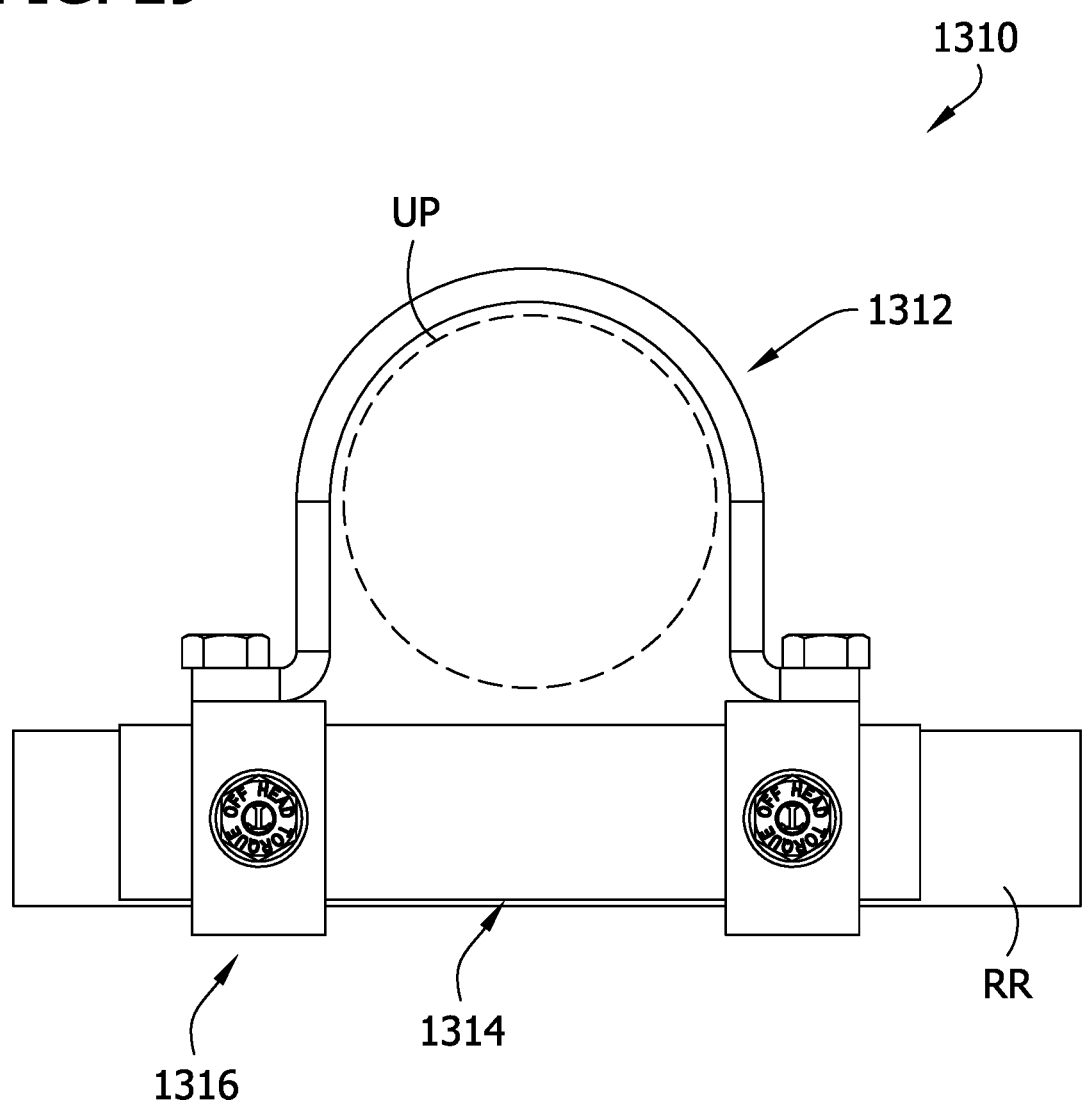
FIG. 29 is a front elevation of the seismic brace of FIG. 28.

Referring to FIGS. 28 and 29, a fourteenth embodiment of the seismic clamp for bracing a non-structural component, such as the utility pipe UP, to the rigid rod RR within a building is generally indicated at reference numeral 1310. The seismic clamp 1310 generally includes a pipe holder, generally indicated at 1312, configured to secure the utility pipe UP to the seismic clamp; a spacer, generally indicated at 1314, configured to be disposed between the utility pipe and the rigid rod to inhibit the rigid rod from contacting the utility pipe when the utility pipe is secured to the seismic clamp; and a rod fitting, generally indicated at 1316, configured to secure the seismic clamp to the rigid rod. This seismic clamp 1310 is similar to the eighth seismic clamp 710, except as hereinafter described. The spacer 1314 comprises a sleeve that is received on the rigid rod RR and at least partially surrounds the circumference of the rigid rod.

Figure 30:
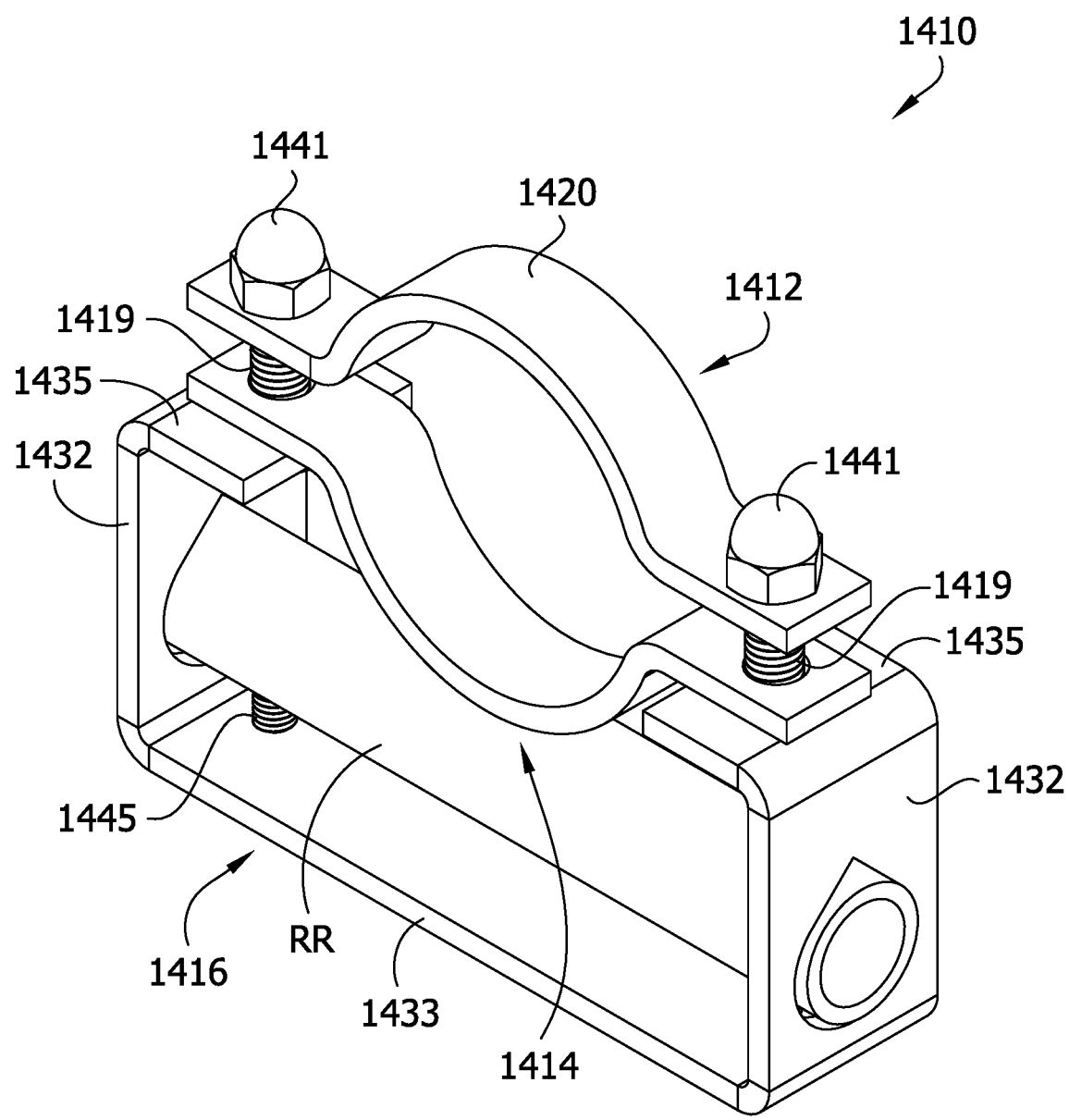
FIG. 30 is a perspective of a fifteenth embodiment of a seismic clamp constructed according to the teachings of the present disclosure.
Figure 31:
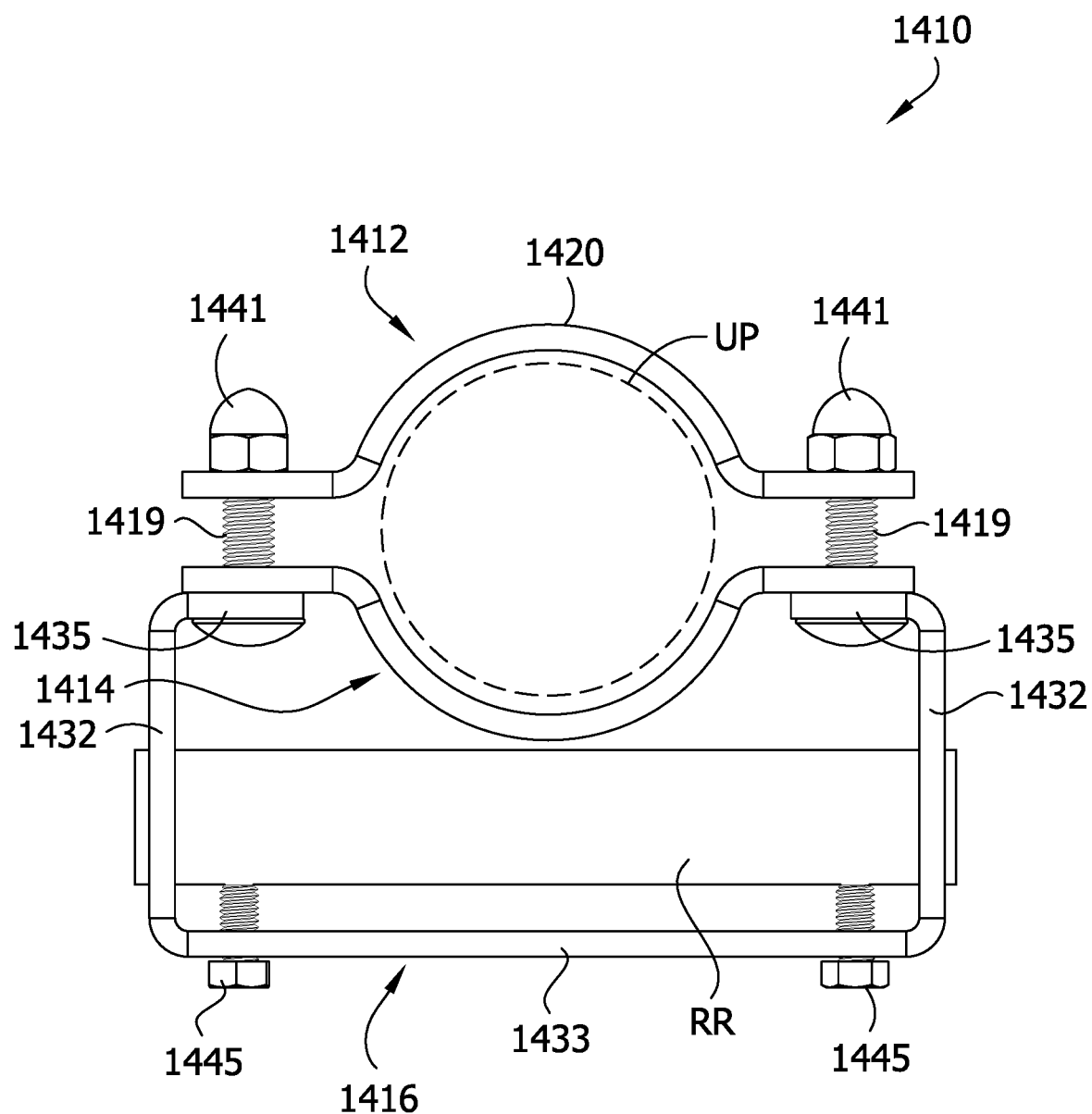
FIG. 31 is a front elevation of the seismic brace of FIG. 30.

Referring to FIGS. 30 and 31, a fifteenth embodiment of the seismic clamp for bracing a non-structural component, such as the utility pipe UP, to the rigid rod RR within a building is generally indicated at reference numeral 1410. The seismic clamp 1410 generally includes a pipe holder, generally indicated at 1412, configured to secure the utility pipe UP to the seismic clamp; a spacer, generally indicated at 1414, configured to be disposed between the utility pipe and the rigid rod to inhibit the rigid rod from contacting the utility pipe when the utility pipe is secured to the seismic clamp; and a rod fitting, generally indicated at 1416, configured to secure the seismic clamp to the rigid rod. This seismic clamp 1410 is similar to the fifth seismic clamp 410, except as hereinafter described. Central portions 1420 of the respective pipe holder 1412 and spacer 1414 are generally arcuate. Moreover, the ears 1435 of the rod fitting 1416 extend inwardly toward one another at the upper ends of the first and second side walls 1432. Also, the bottom wall 1433 includes two threaded openings in which fasteners 1445 are threadably received and function as set screws of the rod fitting 1416, similar to the fifth embodiment.

As with the teachings of all of the other illustrated embodiments, the holder 1412 does not deform, either plastically or elastically, the utility pipe, and in particular a plastic utility pipe (e.g., a CPVC pipe). As with the fifth embodiment, the capped nuts 1441 threaded on the fasteners 1419 (e.g., bolts) limit the tightening of the holder 1412 on the utility pipe UP to limit the force applied to the utility pipe by the holder so that the holder does not deform, either plastically or elastically, the utility pipe, and in particular a plastic utility pipe (e.g., a CPVC pipe). Moreover, the rigid rod RR and the utility pipe UP extend transverse (e.g., perpendicular) with respect to one another.

Figure 32:
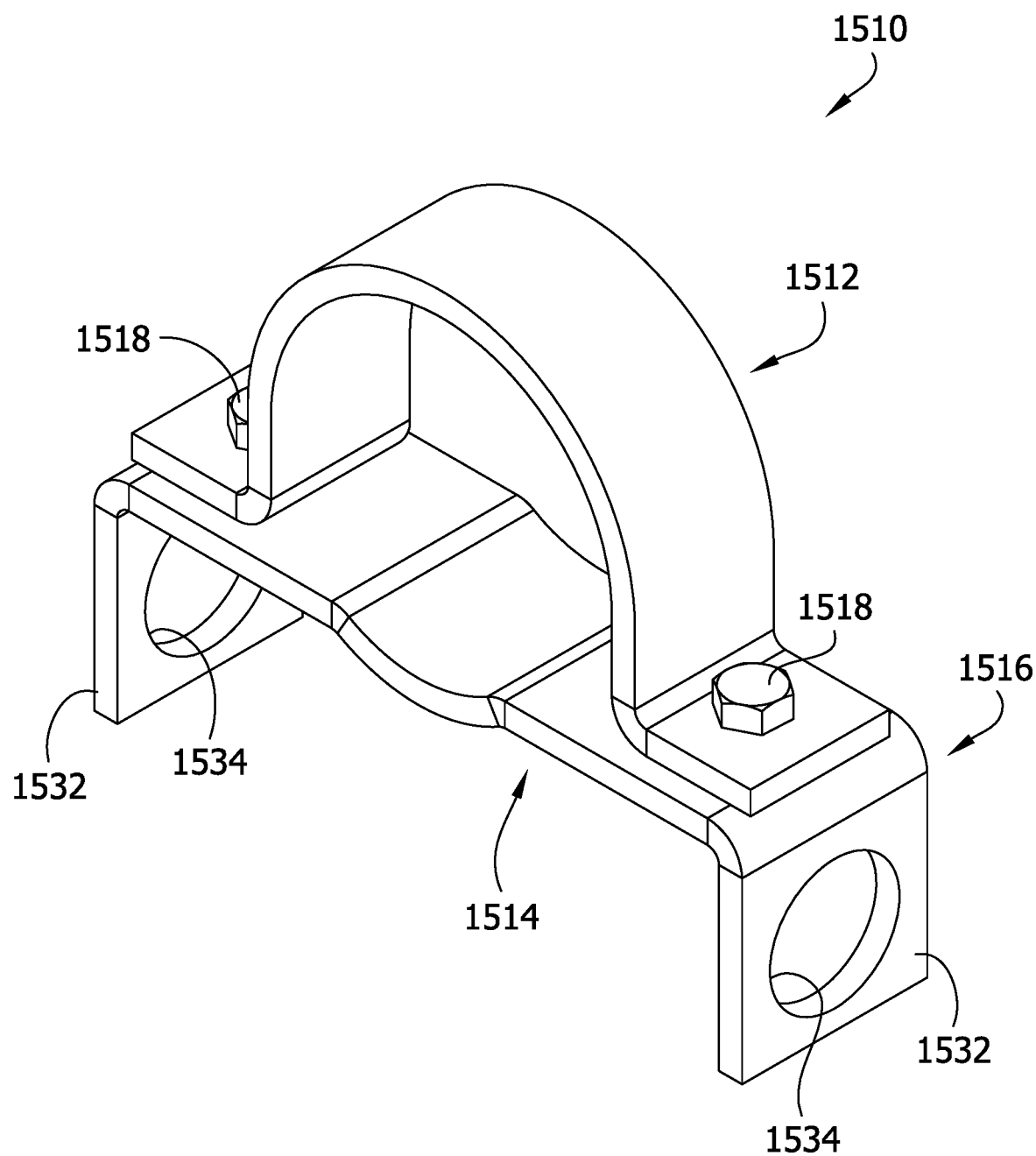
FIG. 32 is a perspective of a sixteenth embodiment of a seismic clamp constructed according to the teachings of the present disclosure.
Figure 33:
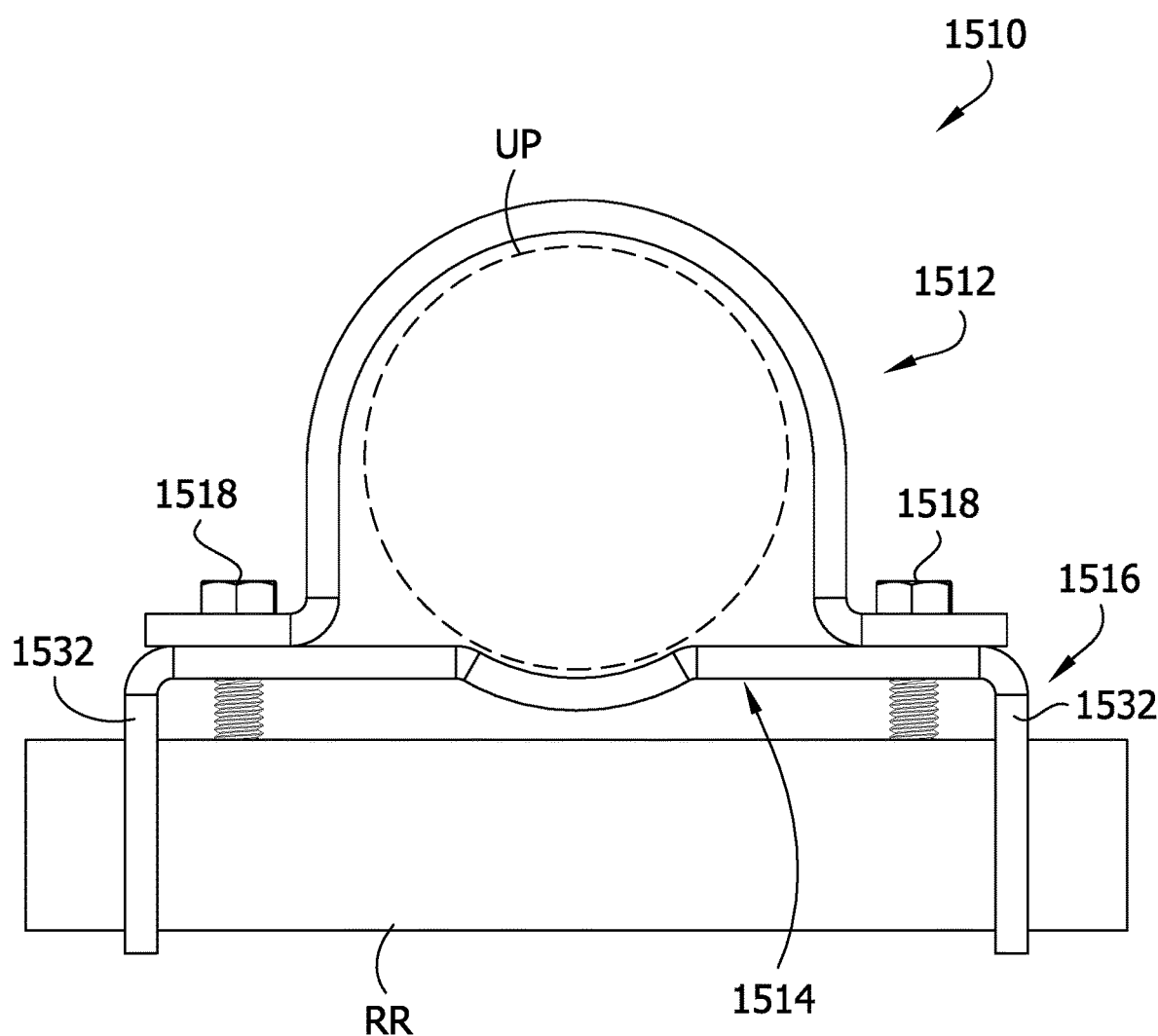
FIG. 33 is a front elevation of the seismic brace of FIG. 32.

Referring to FIGS. 32 and 33, a sixteenth embodiment of the seismic clamp for bracing a non-structural component, such as utility pipe UP, to the rigid rod RR within a building is generally indicated at reference numeral 1510. The seismic clamp 1510 generally includes a pipe holder, generally indicated at 1512, configured to secure the utility pipe UP to the seismic clamp; a spacer, generally indicated at 1514, configured to be disposed between the utility pipe and the rigid rod to inhibit the rigid rod from contacting the utility pipe when the utility pipe is secured to the seismic clamp; and a rod fitting, generally indicated at 1516, configured to secure the seismic clamp to the rigid rod. This seismic clamp 1510 is similar to the first seismic clamp 10, except as described hereinafter. The arms 1532 define rod-receiving openings 1534 extending through the arms 1532. The ends of the fasteners 1518 extending through the ears 1528 of the spacer 1514 engage the rigid rod RR within the rod-receiving openings 1534.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A braced utility assembly configured to be mounted within a building, the braced assembly comprising:
    a utility pipe;
    a rigid rod configured to be attached to a structural component of the building; and
    a seismic clamp securing the utility pipe to the rigid rod such that the rigid rod extends transverse to the utility pipe, the seismic clamp including
        a pipe holder including a strap having an arcuate central portion and opposite ears extending outward from opposite ends of the arcuate central portion,
        a spacer opposing the pipe holder, wherein the utility pipe is sandwiched between the pipe holder and the spacer,
        arms extending from the spacer in a direction opposite the pipe holder, wherein the arms define aligned openings in which the rigid rod is received, and
        fasteners extending through the ears of the pipe holder and the spacer,
    wherein the fasteners both i) fasten the pipe holder to the spacer with the utility pipe received therebetween to clamp the utility pipe to the seismic clamp, and ii) engage the rigid rod received in the aligned openings of the arms to bear the rigid rod against the arms in the aligned openings to secure the rigid rod to the seismic clamp.

2. The braced utility assembly configured to be mounted within a building set forth in claim 1, wherein the rigid rod extends perpendicular to the utility pipe.

3. The braced utility assembly configured to be mounted within a building set forth in claim 1, wherein the utility pipe is a plastic utility pipe, wherein the pipe holder secures the plastic utility pipe to the seismic clamp without deforming the plastic utility pipe.

4. The braced utility assembly configured to be mounted within a building set forth in claim 1, wherein the spacer comprises a bearing surface on which the utility pipe is supported.

5. The braced utility assembly configured to be mounted within a building set forth in claim 4, wherein the spacer comprises a saddle defining the bearing surface.

6. The braced utility assembly configured to be mounted within a building set forth in claim 4, wherein the spacer comprises opposite tabs defining the bearing surface.

7. The braced utility assembly configured to be mounted within a building set forth in claim 4, wherein the spacer comprises a sleeve at least partially surrounding rigid rod and defining the bearing surface.

8. The braced utility assembly configured to be mounted within a building set forth in claim 1, wherein the seismic clamp includes a rod fitting defining a bearing surface supporting the rigid rod, the seismic clamp including a set screw pressing the rigid rod against the bearing surface.

9. A seismic clamp for securing a utility pipe to a rigid rod, the seismic clamp comprising:
   a pipe holder configured to secure the utility pipe to the seismic clamp such that the utility pipe extends in a first direction;
   a rod fitting configured to secure the rigid rod to the seismic clamp so that the rigid rod extends in a second direction transverse to the first direction;
   a spacer disposed between the pipe holder and the rod fitting, wherein the spacer is configured to inhibit the rigid rod from contacting the utility pipe when the utility pipe is secured to the seismic clamp and the rigid rod is secured to the seismic clamp, wherein the spacer comprises a saddle defining a bearing surface; and
   at least one fastener configured to both i) extend through and fasten the pipe holder to the spacer, and ii) function as a set screw and engage the rigid rod to secure the rod fitting to the rigid rod.

10. The seismic clamp for securing a utility pipe to a rigid rod set forth in claim 9, wherein the pipe holder is configured to secure the utility pipe to the seismic clamp without deforming the utility pipe when the utility pipe is a plastic utility pipe.

11. The seismic clamp for securing a utility pipe to a rigid rod set forth in claim 9, wherein the spacer comprises opposite tabs defining the bearing surface.

12. The seismic clamp for securing a utility pipe to a rigid rod set forth in claim 9, wherein the spacer comprises a sleeve configured to at least partially surrounding rigid rod and defining the bearing surface.

\* \* \* \* \*